United States Patent
Khare et al.

(10) Patent No.: US 9,184,611 B2
(45) Date of Patent: Nov. 10, 2015

(54) METHOD AND SYSTEM FOR MAGNETIC FIELD PROBING FOR SEALED-ACID BATTERY DIAGNOSIS

(71) Applicant: Villanova University, Villanova, PA (US)

(72) Inventors: Neeta Khare, Bryn Mawr, PA (US); Pritpal Singh, Media, PA (US); John Vassiliou, Berwyn, PA (US)

(73) Assignee: Villanova University, Villanova, PA (US)

( * ) Notice: Subject to any disclaimer, the term of this patent is extended or adjusted under 35 U.S.C. 154(b) by 497 days.

(21) Appl. No.: 13/646,986

(22) Filed: Oct. 8, 2012

(65) Prior Publication Data
US 2013/0088204 A1    Apr. 11, 2013

Related U.S. Application Data

(60) Provisional application No. 61/545,220, filed on Oct. 10, 2011.

(51) Int. Cl.
*H02J 7/00*    (2006.01)

(52) U.S. Cl.
CPC ......... *H02J 7/0047* (2013.01); *H02J 2007/005* (2013.01)

(58) Field of Classification Search
CPC ...... H02J 7/00; H02J 7/0047; H02J 2007/005
USPC ........................................................ 320/134
See application file for complete search history.

(56) References Cited

U.S. PATENT DOCUMENTS

| | | | |
|---|---|---|---|
| 2010/0079145 A1* | 4/2010 | Meisner et al. | 324/432 |
| 2011/0074432 A1* | 3/2011 | Tinnemeyer | 324/426 |
| 2013/0151180 A1* | 6/2013 | Koch | 702/63 |

OTHER PUBLICATIONS

Tinnemeyer, Jorn, "New Advances in Lithium Ion Battery Monitoring," Battery Power Conference, Dallas Texas, Oct. 19-20, 2010, 8pgs.

Mattera, F., et al., "Characterisation of Photovoltaic Batteries Using Radio Element Detection: The Influence and Consequences of the Electrolyte Stratification," Elsevier, Journal of Power Sources 113 (2003), pp. 400-407.

Guo, Yonglang, et al., "Effects of Electrolyte Stratification of Performances of Flood Lead-Acid Batteries," Journal of the Electrochemical Society, 154(1), College of Chemistry and Chemical Engineering, Fuzhou University, China, pp. A1-A6.

Hill, I., et al., "State-of-Charge Determination of Lead-Acid Batteries Using Wire-Wound Coils," Journal of Power Sources 162 (2006), pp. 870-877.

Tinnemeyer, Jorn, "31-4: Diamagnetic Measurements in Lead Acid Batteries to Estimate State of Charge," 44th Power Sources Conference 2010, Las Vegas, Nevada, USA, Jun. 14-17, 2010, 4pgs.

* cited by examiner

*Primary Examiner* — Jack Chiang
*Assistant Examiner* — Brandon Bowers
(74) *Attorney, Agent, or Firm* — Duane Morris LLP

(57) ABSTRACT

A system and method for determining the health of a battery. A primary coil may be positioned along a first portion of a battery and a secondary coil may be positioned along a second portion of the battery. The primary coil may then be excited with a signal, and an electromagnetic field induced in the secondary coil by the excited primary coil may be measured. A state of health of the battery may thus correlate to the measured electromagnetic field during operation of the battery. This state of health may be determined as a function of electrolyte stratification, current profile, electrode structure, electrode surface degradation, and combinations thereof.

22 Claims, 21 Drawing Sheets

METHOD AND SYSTEM FOR MAGNETIC FIELD PROBING FOR SEALED-ACID BATTERY DIAGNOSIS

CROSS REFERENCE TO RELATED APPLICATIONS

The present application is co-pending with and claims the priority benefit of the provisional application entitled "Magnetic Field Probing for Sealed-Acid Battery Diagnosis," Application Ser. No. 61/545,220, filed on Oct. 10, 2011, the entirety of which is incorporated herein by reference.

BACKGROUND

A battery is an essential element of a mobile system such as, but not limited to, Electric Vehicles (EV), Hybrid Electric Vehicles (HEV), and the like. Batteries are also essential for proper operation of stationary systems including backup power systems for cell towers and data storage centers and for use as an Uninterrupted Power Supply (UPS). The reliability of these mobile and stationary systems may depend upon performance of the battery and/or an accurate diagnostic of the health or status of a battery. Generally, charge condition of a battery is insufficient to indicate an imminent failure of a battery. Rather, stratification in the electrolyte and deterioration in the electrode structure (e.g., hard sulfation) may correspond to an overall health or status indication of a battery and/or an indication of battery degradation.

Conventional technologies do not possess accurate battery health monitoring systems. Rather, conventional systems generally employ electrical parameters such as battery terminal voltage, current, internal impedance, battery temperature and charge/discharge profile of the battery to determine health of a battery. Further, conventional battery monitoring systems utilize look-up tables generated by laboratory experiments rather than utilizing real time or live indications and chemical parameters for the battery.

Generally, electrochemical behavior of an operating battery may be difficult to interpret due to intermingled electrical and chemical parameters. Further, real time or on-load battery behavior may depend upon chemical reaction rate, electrode structure changes, electrolyte concentration gradient, polarization of electrodes, and motion of ions in the battery electrolyte. Various conventional methods have attempted offline analyses of the sulfation of battery electrodes, electrolyte stratification, and electrode health deterioration due to aging, etc. For example, in "Effects of Electrolyte Stratification on Performances of Flood Lead-Acid Batteries," Guo, et al. employed an offline experiment to measure the effect of charging and discharging on the surface of battery electrodes. In "Characterisation of Photovoltaic Batteries using Radio Element Detection, the Influence and Consequences of the Electrolyte Stratification," Mattera, et al. studied capacity loss in lead acid (LA) batteries due to stratification in photovoltaic systems and used radioelement detection to characterize capacity loss. In "State-of-charge Determination of Lead-acid Batteries using Wire-wound Coils," Hill, et al. determined the state of charge (SOC) for a LA battery using wire wound coils attached to the plastic case of a battery whereby a change in the SOC was inferred by a change in the self and mutual inductance of the coil. Finally, in "Diamagnetic Measurements in Lead Acid Batteries to Estimate State of Charge," and "New Advances in Lithium Ion Battery Monitoring," Tinnemeyer, et al. used a magnetic tunneling junction sensor on a Li-ion battery to predict its SOC. There is, however, no direct method available to measure stratification, sulfation and current distribution within the battery during on-load or real time conditions. Further, there is no method or system available to provide a non-invasive system and method to monitor and analyze chemical parameters in a battery and to use such parameters as indications for battery health.

SUMMARY

Accordingly, there is a need for a system and method for a non-invasive magnetic field probing method and system to analyze chemical parameters such as stratification, electrode structure and current profile in a battery, and use such parameters as indications for real time or run time battery health or degradation.

One embodiment of the present subject matter provides a method for determining the health of a battery. The method may include positioning a primary coil along a first portion of a battery and positioning a secondary coil along a second portion of the battery. In another embodiment, the primary and secondary coils may be placed on opposing sides of the battery such that a magnetic field generated by the coils is substantially perpendicular to an electric field between electrodes of the battery. The primary coil may be excited using a sinusoidal signal, and an electromagnetic field induced in the secondary coil by the excited primary coil may be measured. A state of health of the battery during operation thereof may then correlate to the measured electromagnetic field. For example, the state of health may be determined as a function of electrolyte stratification, current profile, electrode structure, electrode surface degradation, and combinations thereof.

In another embodiment of the present subject matter a system is provided for determining the health of a battery. The system may include a primary coil positioned along a first portion of a battery and a secondary coil positioned along a second portion of the battery. In one embodiment, the primary and secondary coils may be placed on opposing sides of the battery such that a magnetic field generated by the coils is substantially perpendicular to an electric field between electrodes of the battery. The system may also include a signal generator connected to the primary coil for generating a signal to excite the primary coil and a signal analyzer for measuring a magnetic response induced in the secondary coil by the excited primary coil. Battery health may then correlate to the measured magnetic response.

In yet another embodiment of the present subject matter a non-invasive magnetic field probing method is provided for monitoring a battery during battery operation. The method may include generating an alternating current magnetic field between at least one pair of coils situated on a battery and measuring changes in the magnetic field across the battery. A state of health of the operating battery may then be determined as a function of the measured magnetic field changes. For example, these magnetic field changes may be indicative of electrolyte stratification, current profile, electrode structure, electrode surface degradation, and combinations thereof in the battery.

These and other embodiments of the present subject matter will be readily apparent to one skilled in the art to which the disclosure pertains from a perusal or the claims, the appended drawings, and the following detailed description.

DETAILED DESCRIPTION

Figure 1:
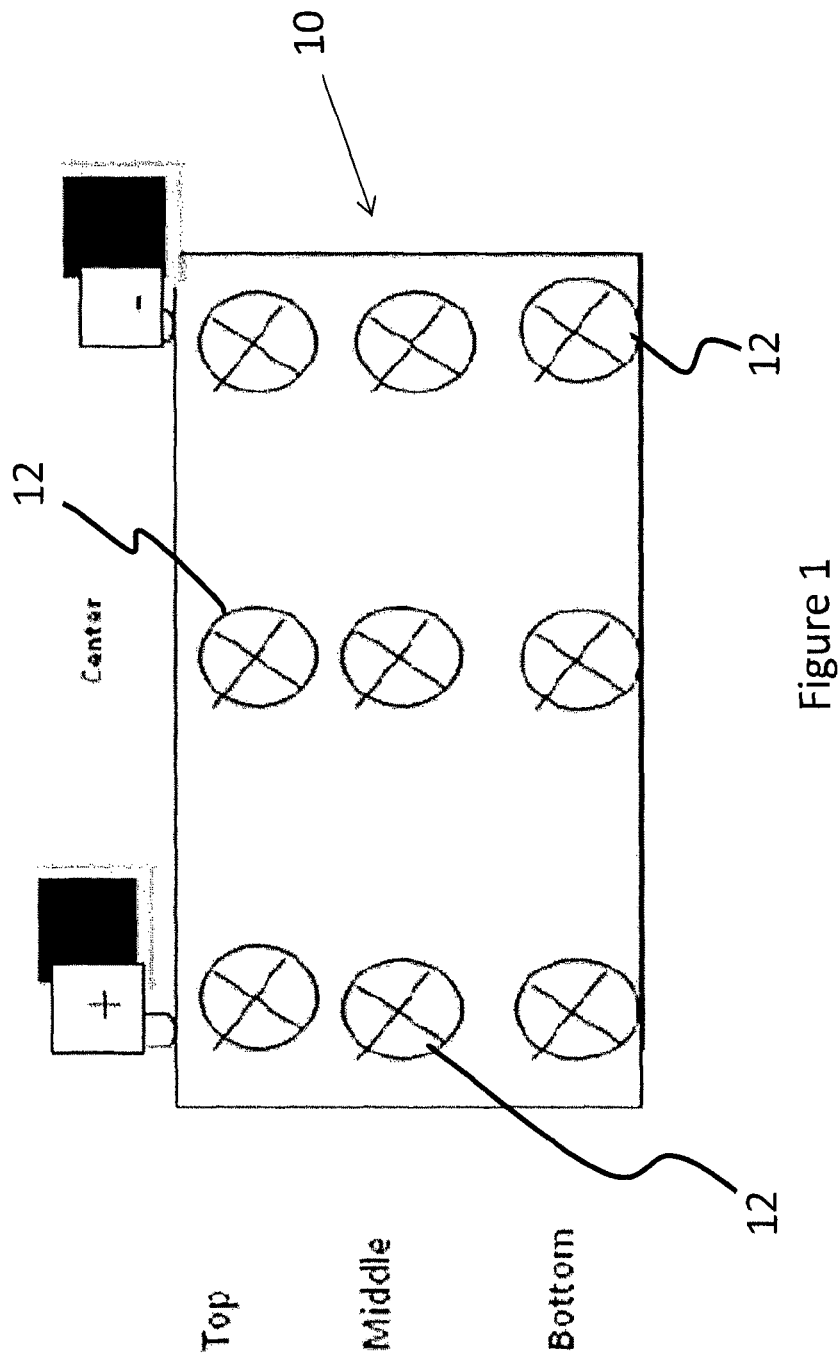
FIG. 1 is a simplified diagram of horizontal and vertical coil positions on an exemplary external structure of a battery.

With reference to the figures, where like elements have been given like numerical designations to facilitate an understanding of the present subject matter, the various embodiments of a method and system for magnetic field probing for sealed-acid battery diagnosis are described.

An accurate health indication during actual run-time of a battery may prevent a critical condition (e.g., failure) in a mobile system implementing a battery such as an Electric Vehicle (EV), Hybrid Electric Vehicle (HEV), and the like. Such health indications also provide useful information for the replacement of and employment in a battery bank for exemplary stationary applications including, but not limited to, backup power systems for cell towers and data storage centers, an Uninterrupted Power Supply (UPS), a grid energy storage system (also known as a large-scale energy storage system) and the like.

Embodiments of the present subject matter may employ a noninvasive magnetic field probing method to observe and monitor battery behavior or status during the charging, discharging, and/or stationary (i.e., a battery in equilibrium that is neither discharging nor charging) process of a battery. Exemplary batteries include, but are not limited to, Sealed Lead Acid (SLA) batteries, Lead-Acid (LA) batteries, Lithium-ion batteries, (e.g., $LiFePO_4$ batteries, etc.), and other batteries utilized in the aforementioned mobile and stationary systems or applications. Thus, reference to any one type of battery in the present disclosure should not limit the scope of the claims appended herewith. In one embodiment, a magnetic field may be generated by placing two substantially identical coils (a primary and a second coil) across a battery. The battery may then be placed in the magnetic field such that the outside magnetic flux lines and internal electric field lines between the battery electrodes are perpendicular to each other. Flux lines generated by the primary coil are then linked to the secondary coil after passing through the battery. Any change in the respective Magnetic Field Response (MFR) or in magnetic flux lines across the battery may be detected, observed and/or monitored for use. Such changes in the MFR or flux lines may be due to internal electric field variation during the charging and discharging of the respective battery or for other reasons related to this process, i.e., a change in the susceptibility of the electrodes, the electric field generated due to drift voltage at the electrodes, etc. Such changes may also be due to a change in H+ proton concentration which has magnetic dipole moments and due to the positioning of battery electrode plates in relation to magnetic flux lines.

In one embodiment, changes in MFR or flux linkage between the primary and secondary coils may be measured by electromotive force (emf) induced in the secondary coil. The change in induced emf (mV) or Secondary Coil Voltage (SCV) may be an indication of the battery behavior and its respective internal health. Such measurements may be employed to predict electrolyte concentration gradient horizontally and vertically in the physical structure of the battery, reaction rate on an electrode's surface, and electrode polarization (e.g., due to the polarization of the electrodes, a drift voltage may appear between the electrodes and result in an electric field; this electric field may be inferred with a change in the MFR).

The principles underlying embodiments of the present subject matter generally relate to the notion that SCV ($V_2(t)$) is related to the concentration of H+ protons in a battery. For example, considering a sinusoidal applied current in a primary coil $I_1(t)$:

$$I_1(t) = I_{01} \sin \omega t \quad (1)$$

it follows that $$V_2(t) = M_{12} \frac{\partial I_1}{\partial t} = \omega M_{12} I_{01} \cos \omega t \quad (2)$$

where $M_{12}$ represents the mutual inductance of the primary and secondary coils, and $V_2(t)$ represents induced emf in the secondary coil. Mutual inductance of the two coils may then be represented as:

$$M_{12} = \mu a G(k) \quad (3)$$

where $$k^2 = \frac{4a^2}{4a^2 + d^2}$$

and a and d represent the radius of the coils and the distance between the coils, respectively, and G(k) represents a smooth function of variable k. For the purposes of this disclosure, it may be assumed that a<<d; therefore, k≅2a/d. Hence, the function G may be approximated as follows:

$$G(k) \cong \frac{\pi}{2}\left(1 - \frac{5}{8}k - \frac{1}{64}k^2 + \ldots\right) \cong 1.57 - 0.982\left(\frac{a}{d}\right) - 0.024\left(\frac{a}{d}\right)^2 + \ldots \quad (4)$$

where μ represents the permeability of the material in the volume between the coils, which includes all the parts of the battery electrolyte and the electrodes and may be represented as:

$$\mu = \mu_0(1+\chi_m) \quad (5)$$

where $\chi_m$ and $\mu_0$ represent the susceptibility of the electrolyte and the permeability of air, respectively. $\chi_m$ is proportional to proton concentration $n_P(t)$ and proton dipole magnetic moment $\mu_P$; therefore, using Equations (2), (3), (4) and (5), it follows that the instantaneous amplitude of the induced voltage in the secondary coil $V_2(t)$ (SCV) is related to the instantaneous value of proton concentration:

$$V_2(t) = A n_P(t) \quad (6)$$

where A represents a proportionality constant, if all other geometrical factors are kept constant. The measured SCV is the voltage change $\Delta V_2(t)$ during the charging and discharging process and may be represented as:

$$\frac{\Delta V_2(t)}{V_2(0)} = \frac{n_P(t)}{n_P(0)} \quad (7)$$

where $V_2(0)$ and $n_P(0)$ represent initial SCV and proton concentration, respectively. Equation (7) indicates the relationship between SCV and H+ proton concentration, and it follows that SCV may thus be an accurate measure of MFR.

The principles underlying embodiments of the present subject matter were then verified by experimental measurements and observations. An experimental setup was provided employing a glass jar half filled with water. Concentrated sulfuric acid was poured on the top of the water and the jar was left to rest for approximately 10 to 12 hours. Heavy sulfuric acid settled to the bottom of the jar and created a stratification condition. The jar was then moved between exemplary primary and secondary coils to observe the effect of stratification under a magnetic field. In one implementation, the primary coil was excited with an AC input signal of frequency 70 kHz and amplitude 625 mV, and SCV was observed in the secondary coil located 12 cm from the primary coil. Table 1 below provides the experimental results.

TABLE 1

| Medium for magnetic flux to travel | Air | Water | 10% $H_2SO_4$ | 25% $H_2SO_4$ | 50% $H_2SO_4$ |
|---|---|---|---|---|---|
| SCV | 486.1 mV | 440.5 mV | 387.8 mV | 339.6 mV | 150 mV |

With reference to Table 1 above, it was demonstrated that concentrated acid may reduce flux linkage in the secondary coil as well as the SCV, and it was demonstrated that water content increases flux linkage. Of course, the values provided in Table 1 above should not limit the scope of the claims appended herewith as these values are presented solely for descriptive purposes.

In a further experiment using the apparatus described above, two lead plates (oxidized due to atmosphere) were inserted in the stratified liquid jar and positioned facing the coils and then having an edge facing the coils whereby the resulting SCV was observed. It was discovered that when a metal (Pb) plate(s) faced the magnetic lines, most of the flux lines were screened due to eddy losses through the metal plate; however, when the plate(s) was parallel (i.e., edge-on) to the magnetic flux lines, the strength of the magnetic flux linkage increased as well as observed SCV.

Additional principles underlying embodiments of the present subject matter were verified utilizing additional experimental measurements. For example, battery behavior using noninvasive magnetic field probing was observed using a 12 V Genesis SLA battery in an AC magnetic field. In this experiment, the SLA battery was placed between two identical, coaxial coils (primary and secondary coils) having a coil axis parallel to the respective battery plates. The primary and secondary coils each possessed 250 turns, were each 4.0 cm in diameter, and were placed 16.3 cm apart across the battery width. The coil diameter was approximately 13% of the total length of the battery (29.5 cm), and the length of the battery housed 6 pairs of electrodes having a 4.9 cm space for each pair. In this experiment, the primary coil was excited by an input signal having a frequency of 70 kHz and amplitude of 9V. A General Radio Oscillator (1310 B) was used to generate the input AC signal for the primary coil, and a HP 3561A Dynamic signal analyzer or other device (e.g., AC voltmeter, spectrum analyzers, etc.) was used to measure the root mean square (rms) value of the induced emf at the secondary coil (SCV). The magnetic field was then measured with a Hall Effect probe (5100 F.W. Bell) at distance of 16.3 cm corresponding to the width of the battery. This experiment resulted in an external magnetic field substantially perpendicular to the internal electric field generated by the battery electrodes whereby the average radial component of the magnetic fields was 19G. Notably, when the battery was placed between the coils (16.3 cm apart) the magnetic field at the secondary coil was measured at 19.3 G.

FIG. 1 is a simplified diagram of horizontal and vertical coil positions on an exemplary external structure of a battery. With reference to FIG. 1, principles underlying embodiments of the present subject matter were verified utilizing additional experimental measurements. For example, battery behavior may be inferred from secondary coil induced emf measurements during the charging and/or discharging process whereby a battery monitoring system (BMS) charger was used to charge and discharge a battery 10 with a 7 A constant current over approximately 10 hours. Electrolyte concentration gradient under the charging and discharging process was then observed at various vertical and horizontal coil positions 12 of the electrolyte level in the battery 10. As illustrated, the coil positions 12 are in a three-by-three matrix, however, it is envisioned that any geometry for the coils may be used and such a depiction should not limit the scope of the claims appended herewith. Observations of principles underlying embodiments of the present subject matter may be divided into battery performance under magnetic field during charging and discharging, SCV analysis for MFR of a stationary (e.g., equilibrium) battery, and SCV at the three-by-three coil positions (See FIG. 1) with charging and discharging of the battery inside the applied magnetic field.

Figure 2A:
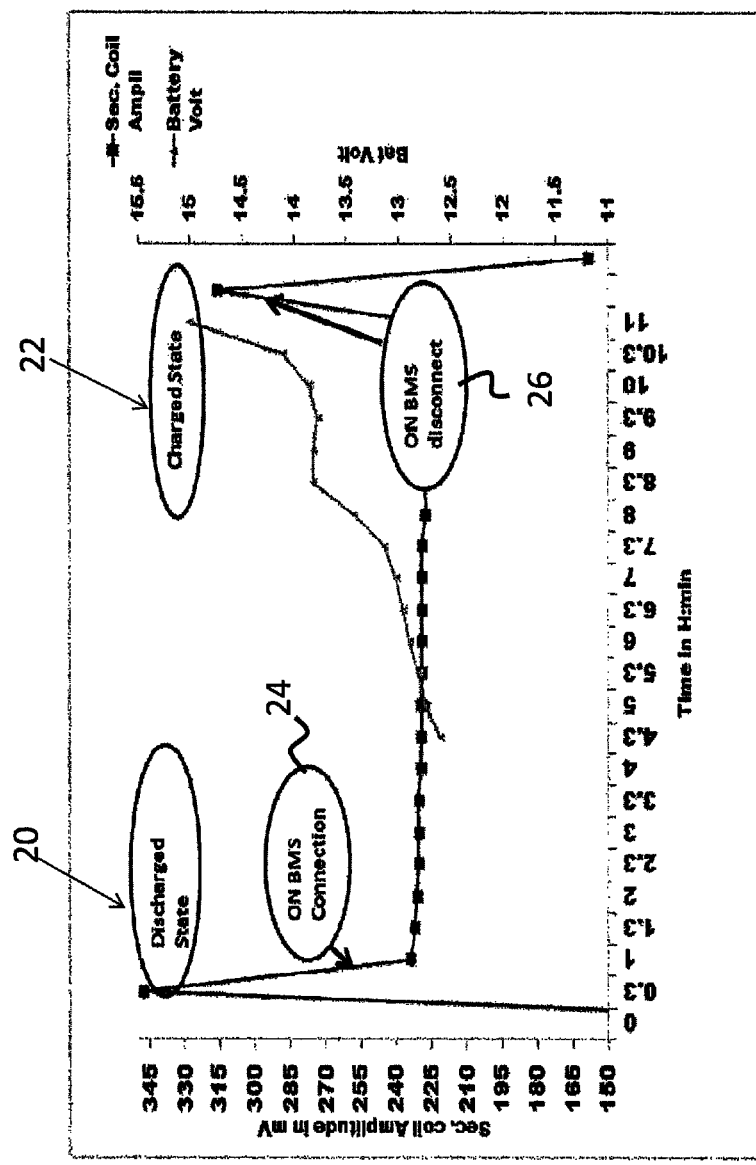
FIG. 2A is a graphical representation of battery charging under the influence of a magnetic field.
Figure 2B:
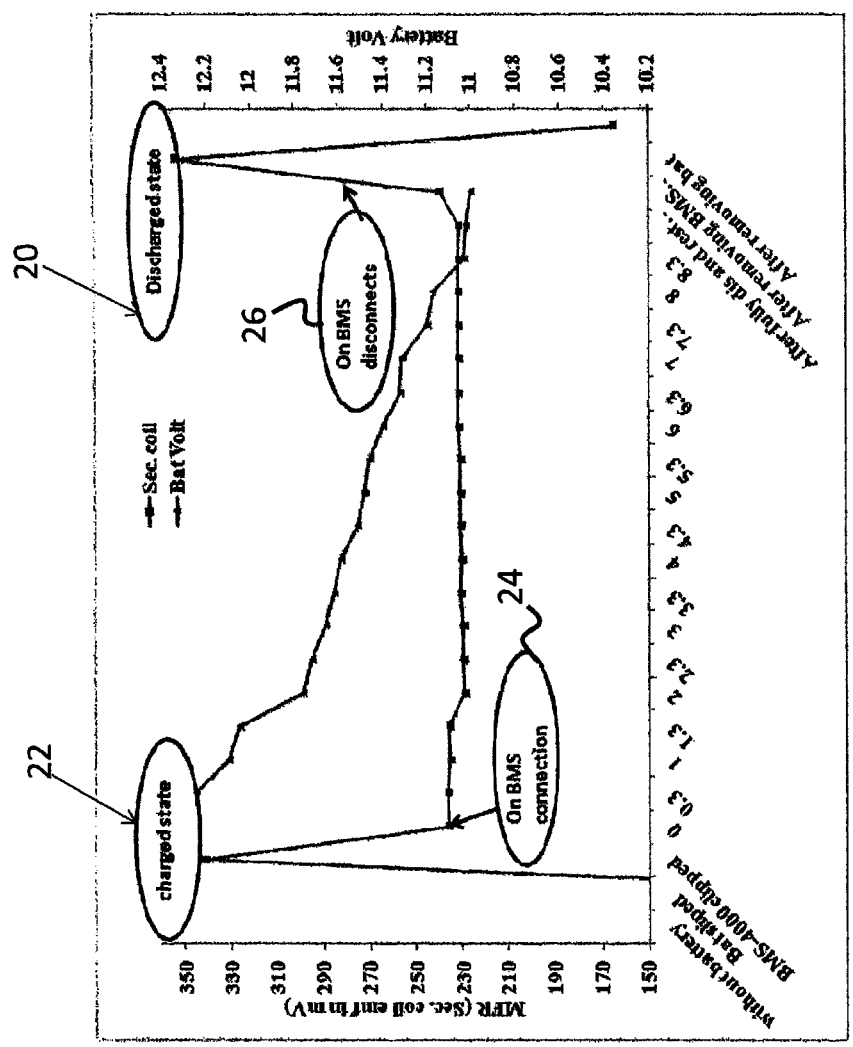
FIG. 2B is a graphical representation of battery discharging under the influence of a magnetic field.

FIG. 2A is a graphical representation of battery charging under the influence of a magnetic field, and FIG. 2B is a graphical representation of battery discharging under the influence of a magnetic field. With reference to FIGS. 2A and 2B, an exemplary battery was placed in an AC magnetic field generated by a coil and the response of an identical symmetric coil as SCV was observed. As shown in FIGS. 2A and 2B, the magnetic flux linkage between these two identical coils may increase when the battery slides between the coils. This increase in the magnetic flux linkage is seen by SCV increases of approximately 120% to 130%. A fully discharged battery 20 illustrates an approximately 10% to 12% higher linkage of magnetic flux in comparison to a fully charged battery 22. It is also illustrated in FIGS. 2A and 2B that the connection 24 and disconnection 26 of a battery monitoring system (BMS) charger to the battery appears to affect magnetic flux linkage in the secondary coil. For example, the connection 24 of the BMS charger appears to reduce the SCV by approximately 25% to 30%.

Figure 3:
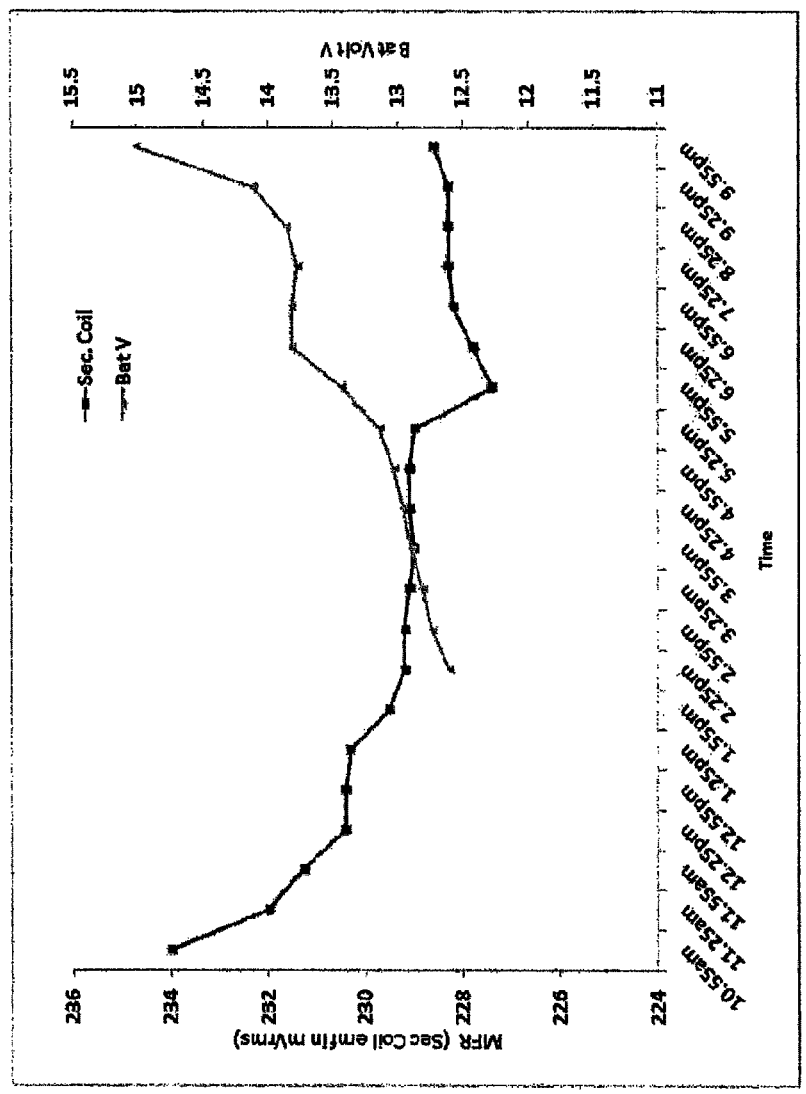
FIG. 3 is a graphical representation of magnetic flux linkage reducing with charging time.
Figure 4:
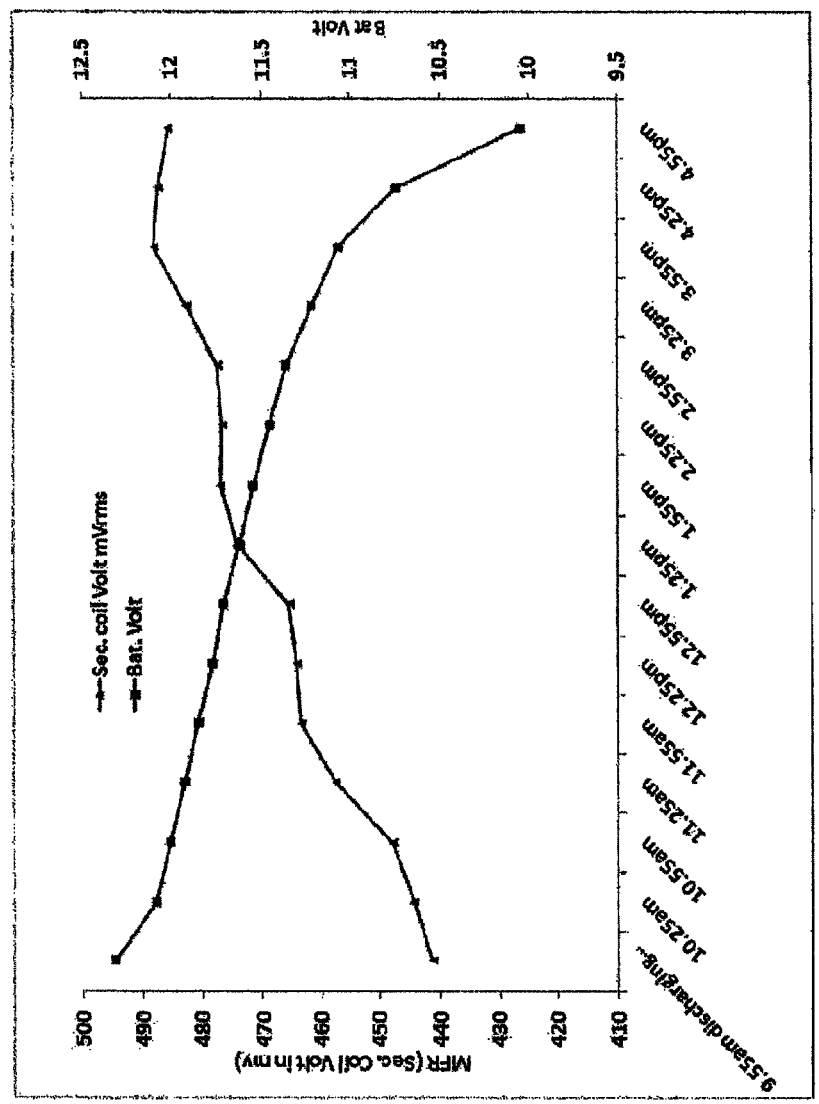
FIG. 4 is a graphical representation of magnetic flux linkage increasing with battery discharging.

FIG. 3 is a graphical representation of magnetic flux linkage reducing with charging time. FIG. 4 is a graphical representation of magnetic flux linkage increasing with battery discharging. With reference to FIGS. 3 and 4 and as described above, SCV may be employed as an index for MFR and is sensitive to battery state (i.e., charging, discharging stationary (equilibrium)). As illustrated in FIG. 3, magnetic flux linkage reduces the SCV from 234 mV to 228 mV (approximately 2.5%) upon charging an exemplary battery (e.g., an Armasafe 12 V, 120 Ah capacity sealed LA battery). As illustrated in FIG. 4, magnetic flux linkage increases the SCV approximately 10% during discharging of an exemplary battery (e.g., a Genesis 12VXE70 battery). While the SCV measurements illustrated in FIGS. 3 and 4 exhibit a higher sensitivity with a Genesis battery with respect to an Armasafe battery, such examples should not limit the scope of the claims appended herewith as embodiments of the present subject matter are applicable to various LA, SLA, lithium-ion and other batteries.

The observational measurements depicted in FIGS. 2A, 2B, 3 and 4 may be described by the finding that a battery establishes an improved magnetic linkage as compared to air due to the presence of H+ protons in the electrolyte. As the H+ proton has a magnetic dipole moment (t) of 2.8 Nucleon Magnetons, when an exemplary battery is exposed to a magnetic field H+ protons will align with the magnetic lines and hence enhance magnetic flux linkage between the coils. The experimental apparatuses used to generate the aforementioned observational measurements were such that the battery electrodes were parallel to the magnetic flux lines and thus increased the magnetic coupling between the coils (i.e., rather than having electrodes facing the magnetic flux lines which screens flux lines due to eddy losses, the electrodes were parallel to the magnetic flux lines which increased the strength of the magnetic field and the SCV).

Figure 5:
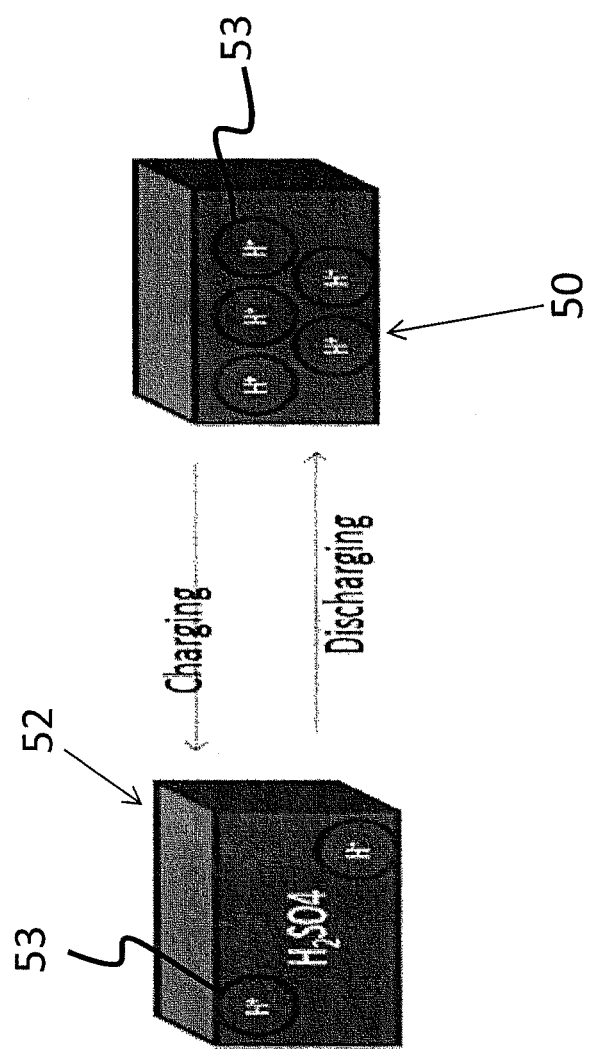
FIG. 5 is a simplified illustration of H+ proton concentration during charging and discharging of a battery.

FIG. 5 is a simplified illustration of H+ proton concentration during charging and discharging of a battery. With reference to FIG. 5, a discharging battery 50 has a relatively low specific gravity compared to a fully charged battery 52 because of a higher percentage of water in the respective electrolyte. This generally increases the H+ proton 53 concentration and is evident by Equation (8) below.

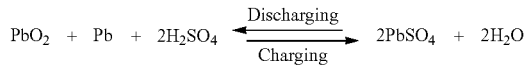

$$PbO_2 + Pb + 2H_2SO_4 \underset{\text{Charging}}{\overset{\text{Discharging}}{\rightleftarrows}} 2PbSO_4 + 2H_2O \qquad (8)$$

It follows that a discharged state of the battery demonstrates better magnetic flux linkage between the coils (e.g., a higher SCV) than the charged state of the battery; however, it should be noted that the H+ proton concentration in the electrolyte and the magnetic flux linkage both vary with specific gravity during battery charging 52 and discharging 50. Similarly, magnetic flux linkage decreases during charging and increases during discharging following the H+ proton concentration variation in the electrolyte. Further, during discharging lead sulfate of the electrodes may convert into lead oxide at the positive plate and lead at the negative plate. Thus, diamagnetic susceptibility of electrodes may increase from −69.7 $x_m/10^{-6}$ cm$^3$ mol$^{-1}$ to −42 $x_m/10^{-6}$ cm$^3$ mol$^{-1}$ for lead which may result in an improved magnetic flux linkage. Thus, during discharging magnetic flux linkage appears to increase. Of course, the opposite may be the case during charging where a decrease in electrode susceptibility results in a weakened magnetic flux linkage.

It has also been found that the internal electric field of the battery affects the magnetic flux linkage. For example, as the internal electric field increases with charging of the battery, the internal magnetic field screens the perpendicular magnetic field and may reduce magnetic flux linkage (SCV) at the secondary coil. During discharging, the internal electric field through the battery electrodes is reduced thus providing a free path for magnetic flux lines to pass through the electrolyte and enhancing magnetic flux linkage at the secondary coil.

Figure 6:
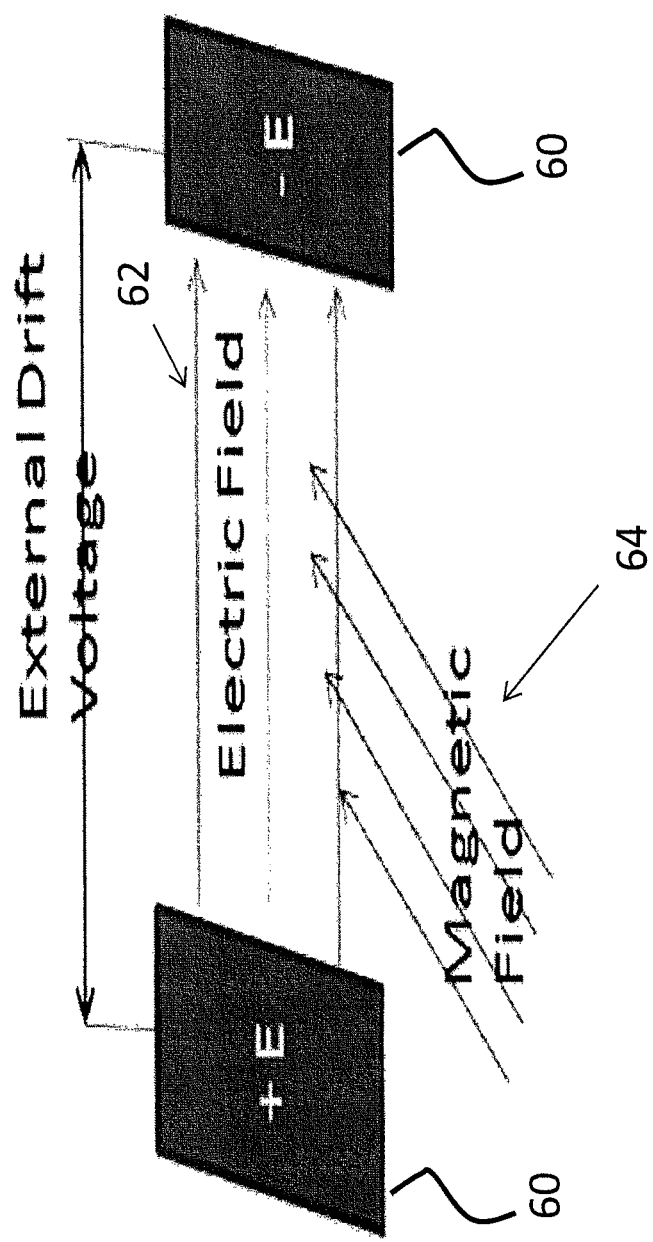
FIG. 6 is a simplified schematic of an effect of battery monitoring system connection to a battery terminal.

FIG. 6 is a simplified schematic of an effect of battery monitoring system (BMS) connection to a battery terminal. With reference to FIG. 6, it was observed that a BMS charger connection to the terminals of a battery may alter magnetic flux linkage. For example, a BMS charger generally applies a DC voltage of around 5V at a battery terminal and polarizes the respective electrodes 60. As a result, the electrodes 60 generate an electric field 62 substantially perpendicular to the existing magnetic flux lines 64. The electric field 62 may interact with the perpendicular magnetic flux lines 64 and screen the magnetic flux lines 64 at a sensing secondary coil (not shown). Exemplary electrodes may be lead, lead oxide, lead sulfate electrodes, to name a few.

Figure 7:
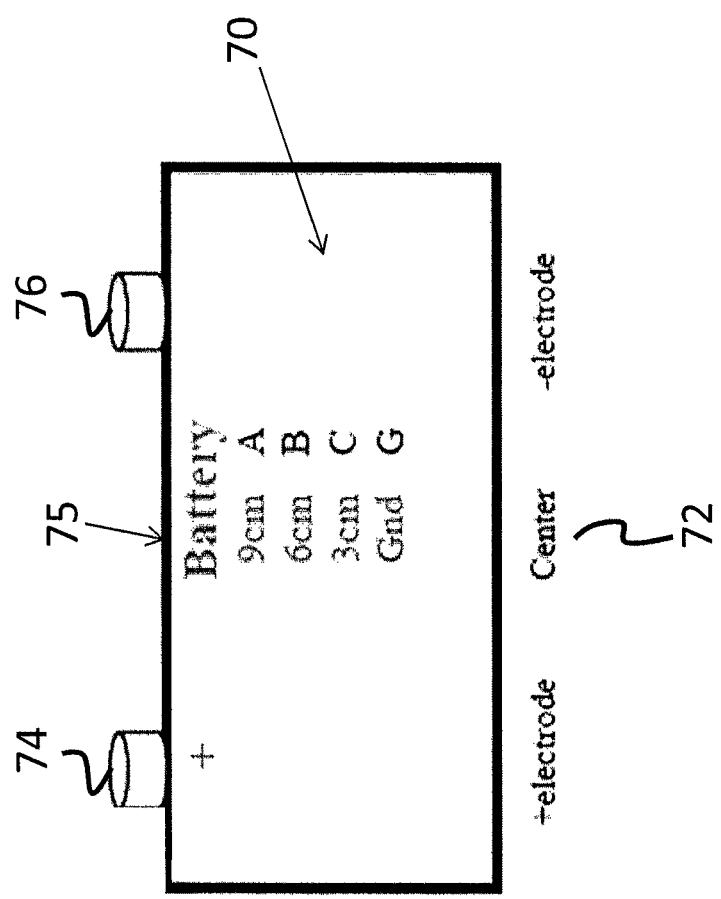
FIG. 7 is a simplified illustration of coil positions on the external frame of a battery.
Figure 8:
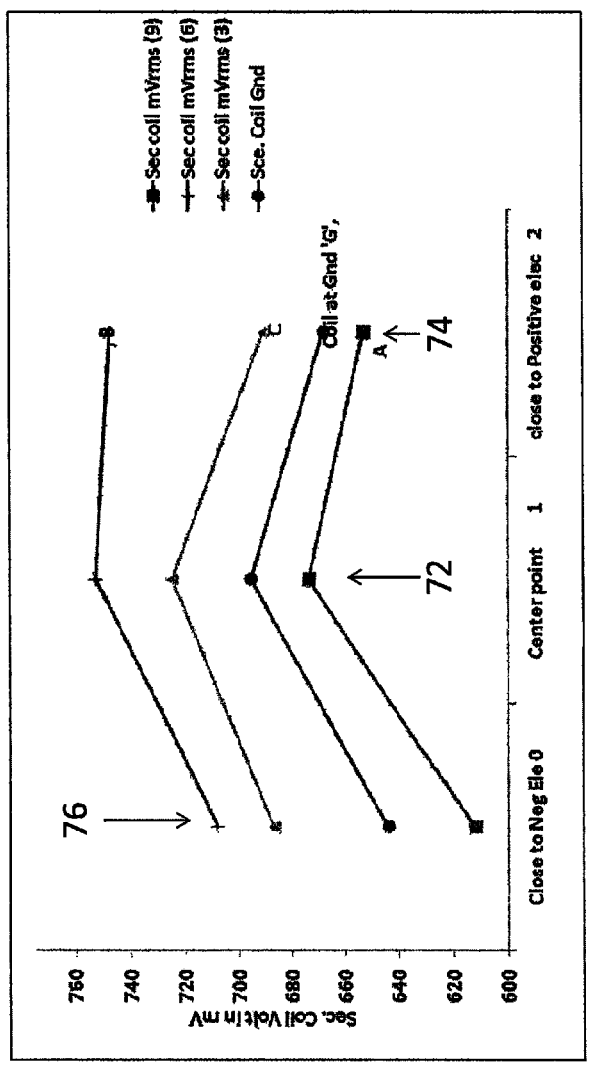
FIG. 8 is a graphical representation of observational measurements of coil position and magnetic flux linkage in secondary coil voltage (SCV) at various vertical positions in the battery of FIG. 7.

FIG. 7 is a simplified illustration of coil positions on the external frame of a battery. With reference to FIG. 7, another set of observational measurements describing principles underlying embodiments of the present subject matter, e.g., SCV analysis for MFR of a stationary (e.g., equilibrium) battery, were taken by a pair of coaxial coils situated at various vertical positions for a fixed horizontal position on an external frame of a battery 70. In this exemplary, non-limiting battery 70, battery length was approximately 29.5 cm, and the battery housed six pairs of electrodes with approximately 4.91 cm of space between each pair of electrodes. The primary and secondary coil diameter were each approximately 4.00 cm equating to 0.91 cm less than the space available between electrodes. If, for example, the electrodes are slimmer than half of the 0.91 cm (0.45 cm), then the coils may still face free space. As will be explained below, it was observed that this electrode free space contained concentrated H+ proton electrolyte thereby resulting in an improvement in the SCV value. Three exemplary, non-limiting horizontal positions selected were the center 72 of the battery and the positive 74 and negative 76 electrodes of the battery. Vertical positions 75 from ground (i.e., floor of the battery), 3 cm, 6 cm and 9 cm are illustrated. It should be noted that while these vertical positions 75 are illustrated at the center 72 of the battery, the same vertical positions 75 are also present at the positive and negative electrodes 74, 76. FIG. 8 is a graphical representation of observational measurements of coil position and magnetic flux linkage in secondary coil voltage (SCV) at various vertical positions in the battery of FIG. 7. With reference to FIG. 8, it is illustrated that SCV values at the electrodes 74, 76 are smaller in comparison to the corresponding values at the center 72 of the battery. It was also observed that the negative electrode (Pb) screens more magnetic flux as compared to the positive electrode (PbO$_2$). Further, at the vertical top position of 9 cm represented by line "A" in FIG. 8, SCV was observed at its lowest value. This 9 cm vertical position of the battery 70 is generally an empty air space used for electrode connections whereby an absence of H+ protons results in a weak magnetic flux linkage between the coils. At the vertical position of 6 cm represented by line "B" in FIG. 8, SCV was observed at its highest value. At the vertical position of 3 cm represented by line "C" in FIG. 8, SCV was observed at a middle value lower than that at the 6 cm position but higher than that observed at the ground position represented by line "G" in FIG. 8. Thus, the vertical position of 6 cm (line "B") has a maximum SCV on an average of 12% higher than that at the ground "G" position. These observations reflect that a response of an exemplary secondary coil situated at a position near the top surface of the respective electrolyte would be high as the electrolyte is generally less concentrated (i.e., high H+ proton) and allows for an improved magnetic flux linkage. It follows that the SCV would gradually decrease in the lower layers of the electrolyte as the electrolyte concentration increases which is illustrated by lines C and G in FIG. 8. Such a gradual decrease in SCV is indicative of a vertical electrolyte concentration gradient in the battery frame and depicts acid stratification in an exemplary LA battery.

With continued reference to FIGS. 7 and 8, it was also observed that SCV values are higher by an average of 4.8% at the center positions 72 of the battery 70 than at the electrodes 74, 76 as the center positions 72 appear to provide free passage for the magnetic flux lines without any electrodes in their respective path. It was further observed that SCV was higher by approximately 3.6% at the positive electrode 74 than at the negative electrode 76. This difference in SCV may be due to the composition of the negative electrode as a metallic plate (Pb) which generally absorbs magnetic flux lines and creates eddy current losses resulting in a lower SCV.

Figure 9:
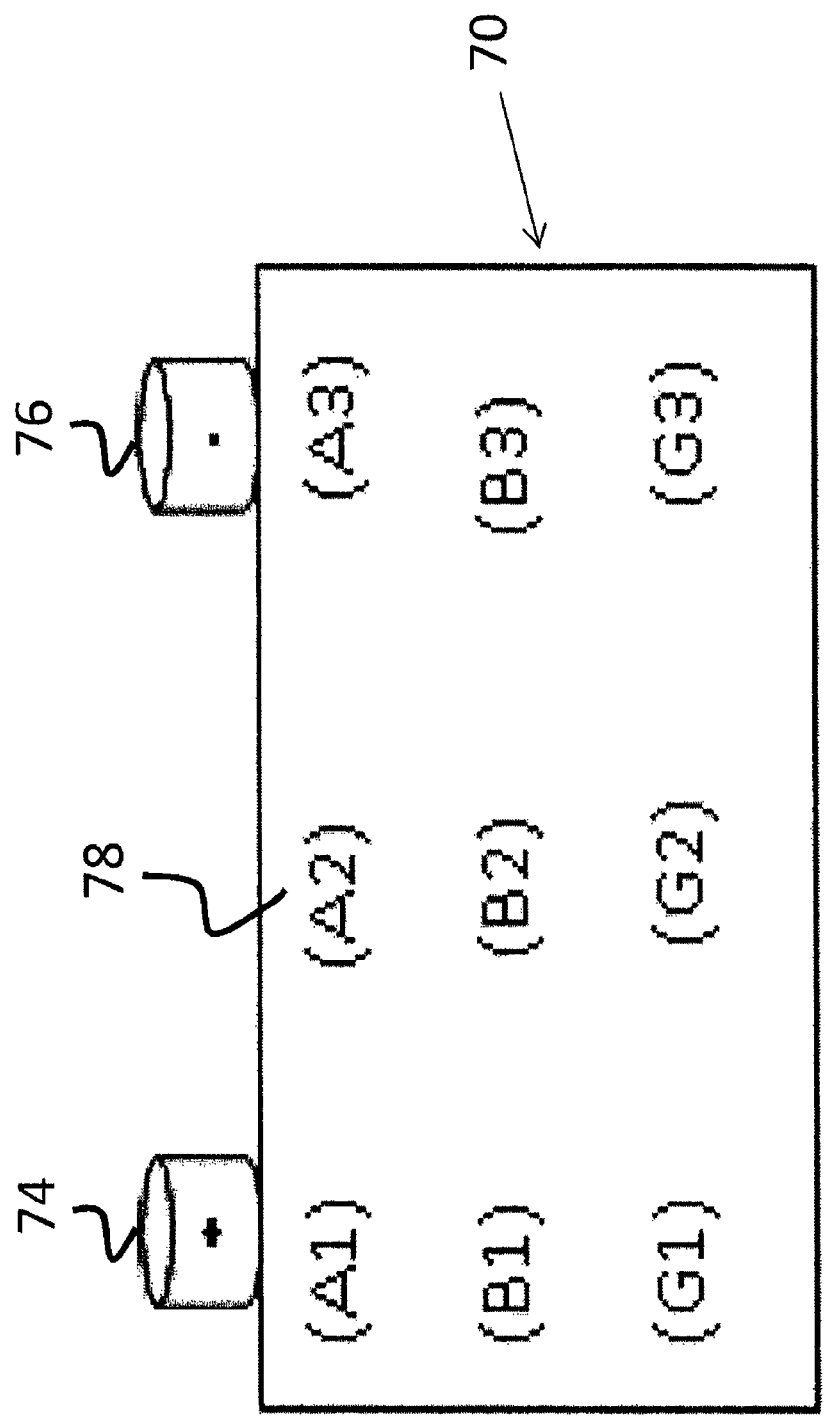
FIG. 9 is a simplified schematic of magnetic coil positions having a 3×3 matrix on a battery frame.

FIG. 9 is another simplified schematic of magnetic coil positions having a 3×3 matrix on a battery frame. With reference to FIG. 9, another set of observational measurements describing principles underlying embodiments of the present subject matter, e.g., SCV analysis at 3×3 coil positions with charging and discharging of a battery under a magnetic field, were observed. Battery charging and discharging measurements were observed at a matrix of three horizontal and three vertical positions of coils 78 on the frame of a battery 70 having positive and negative electrodes 74, 76 and are compared for each row and column position. The measurements were repeated three times at each position and average values taken for the analysis; further, illustrative observational measurements are depicted in FIG. 9 for three column positions exhibited in FIGS. 7-8, namely, the positive electrode 74, the center 72 of the battery, and the negative electrode 76. Each column position 1, 2 and 3 are further divided in three row positions, the top (A), middle (B) and the bottom or ground (G) corresponding to the similarly labeled lines in FIGS. 7-8.

Figure 10:
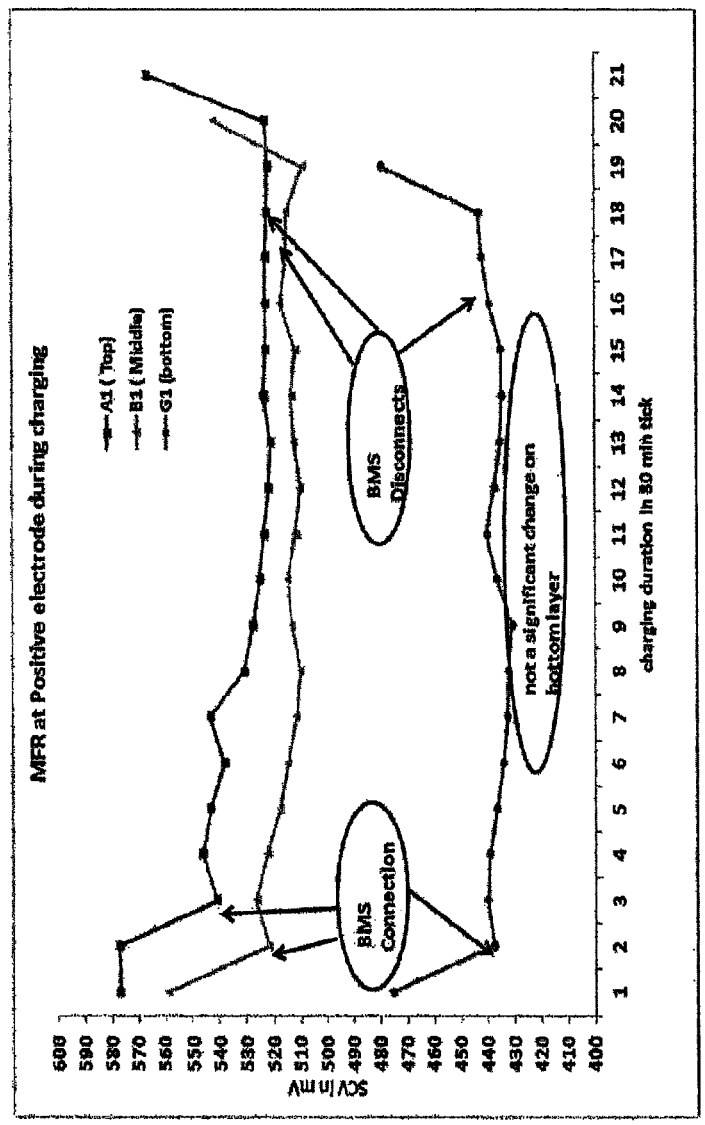
FIG. 10 is a graphical representation of SCV at the positive electrodes of FIG. 9 during charging.
Figure 11:
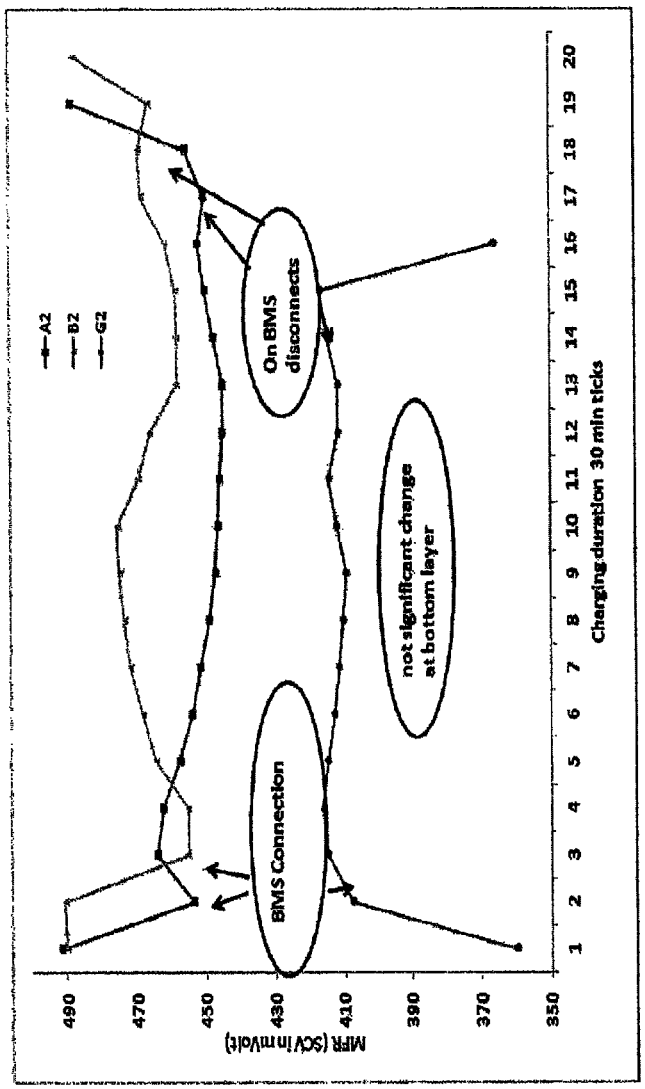
FIG. 11 is a graphical representation of SCV at a center column position of FIG. 9 during charging.
Figure 12:
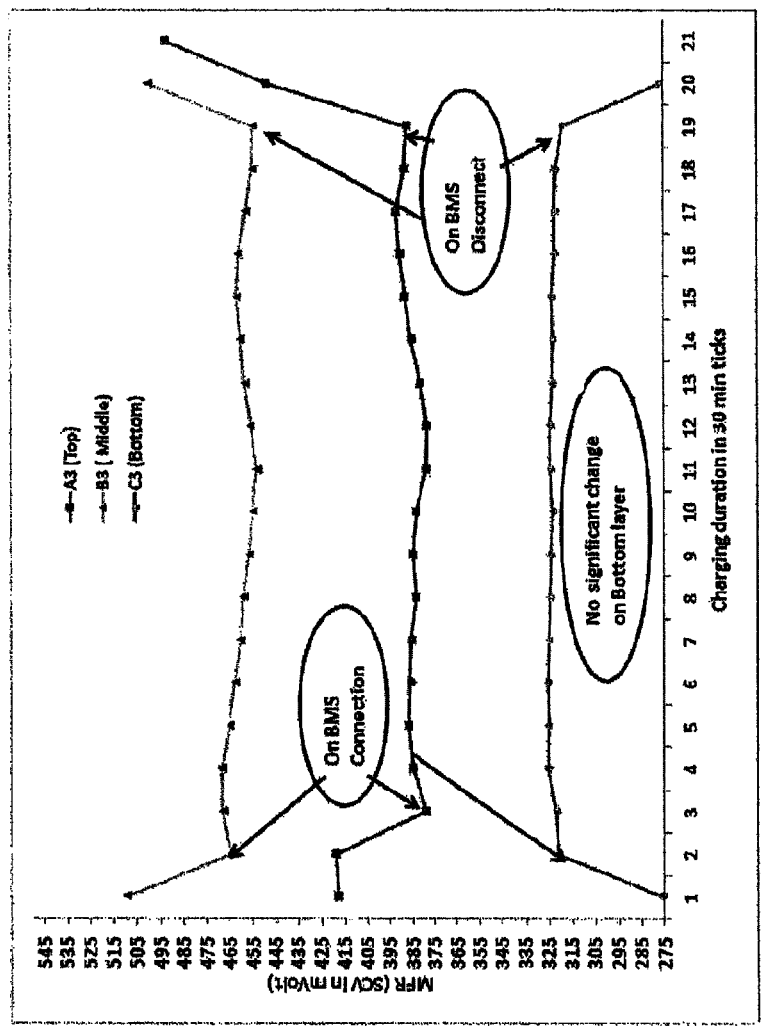
FIG. 12 is a graphical representation of SCV at the negative electrodes of FIG. 9 during charging.
Figure 13:
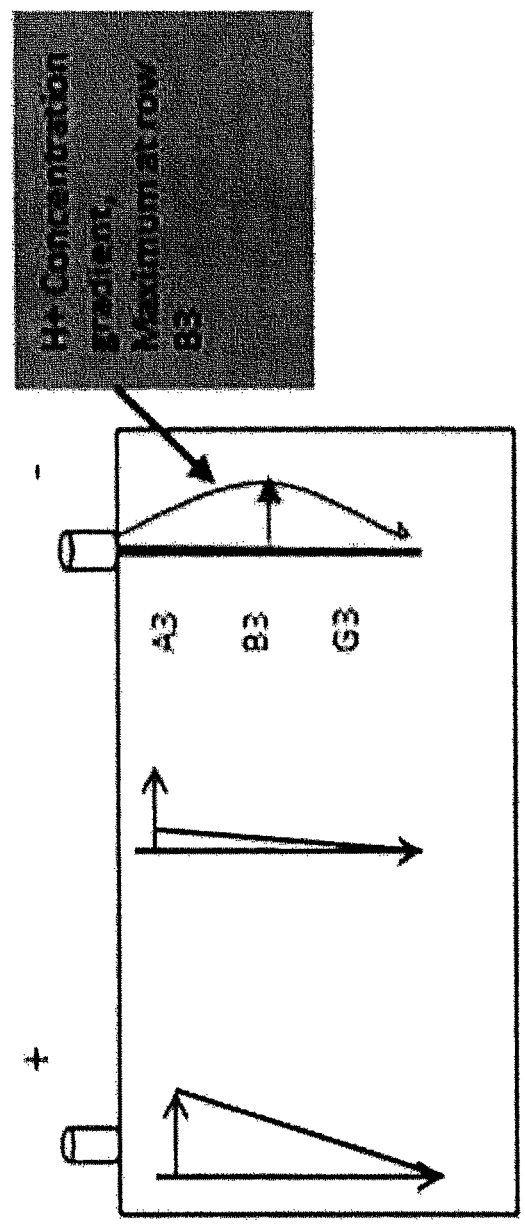
FIG. 13 is a simplified diagram of magnetic flux linkage or H+ proton concentration gradient at a negative electrode.

FIG. 10 is a graphical representation of SCV at the positive electrodes 74 of the battery 70 in FIG. 9 during charging, FIG. 11 is a graphical representation of SCV at a center column position of the battery 70 in FIG. 9 during charging, FIG. 12 is a graphical representation of SCV at the negative electrodes 76 of the battery 70 in FIG. 9 during charging. With reference to FIG. 10, SCV at the top, middle and bottom row positions on the positive electrode 74 of the 3×3 matrix of FIG. 9 are illustrated whereby certain observational patterns and analyses described above are verified. More specifically, it was observed that the charging process reduces SCV, the discharged state shows a higher SCV as compared to the charged state, a BMS charger connection alters SCV, and SCV gradually decreases vertically down from the top row A to the bottom row G at the positive electrode 74. With continued reference to FIG. 10, it was also observed that SCV at the bottom position G1 did not change significantly during the charging process as concentrated acid (H$_2$SO$_4$) accumulates at the bottom layer of the battery 70 and does not appear to promote or allow free H+ protons to remain at the bottom layer. This lower amount of H+ protons results in a lower indication of SCV. With reference to FIG. 11, SCV at the top, middle and bottom row positions of the center section of the matrix of the battery 70 of FIG. 9 are illustrated whereby certain observational patterns and analyses described above are verified. More specifically, it was observed that SCV at the discharged state were higher than at the charged state of the battery 70, and it was observed that the bottom row position G2 did not exhibit a significant change in SCV but rather indicated an opposite pattern upon BMS connection. It may also be observed that SCV does not monotonically decrease vertically down from A2 to G2, and A2 and B2 illustrate an SCV variation having similar range. With reference to FIG. 12, SCV at the top, middle and bottom row positions of the negative electrode 76 of the 3×3 matrix of the battery 70 in FIG. 9 are illustrated where certain observational patterns and analyses described above are verified. More specifically, it was observed that at the negative electrode 76, the SCV pattern was different than at the center and positive electrode 74. Notably, the negative electrode 76 does not appear to exhibit a gradual decrease in SCV from the top row to the bottom row positions (A3 to G3). Further, the middle row position B3 illustrates a maximum SCV at the negative electrode 76 unlike the top row A1 of the positive electrode 74. Such a pattern is illustrative of a vertical Gaussian distribution of SCV or of H+ proton concentration at a negative electrode 76 provided in FIG. 13. With reference to FIG. 13, maximum SCV at node B3 indicates a maximum H+ proton concentration (i.e., lowest concentration of electrolyte) as the H+ proton is primarily consumed at the electrodes 74, 76 during a charging process. It should be noted that the terms node and electrode may be used interchangeably herein and such use should not limit the scope of the claims appended herewith. Additionally, the H+ proton Gaussian distribution illustrated in FIG. 13 indicates that node B3 consumes less H+ proton and therefore the negative electrode 76 is the less active node during the charging process. Such a Gaussian distribution may also explain the reaction centers or current gradients at the negative electrode surface; however, the gradual decrease in SCV (H+ proton concentration) at the positive electrode 74 and the center column suggests stratification in the battery 70.

With continued reference to FIGS. 11 and 12, it was observed that SCV sharply increases at the bottom or ground row G when connected to the BMS. This sharp increase in SCV was opposite to the top and middle row responses previously depicted when connected to the BMS as the BMS connection applies drift voltage on the electrodes which then generates an electric field between the battery terminals. As is known, in LA, SLA, lithium-ion, and other battery types, the electrodes do not reach to the bottom or ground row. Thus, a drift electric field would not appear strongly at the bottom layer G and hence the electric field would not screen the magnetic flux linkage. Additionally, under the influence of this drift electric field, the concentrated acid at the bottom layer may break into respective ions and support flux linkage on the BMS connection thereby resulting in the observed sharp increase in the SCV on the BMS connection at the bottom row.

Figure 14:
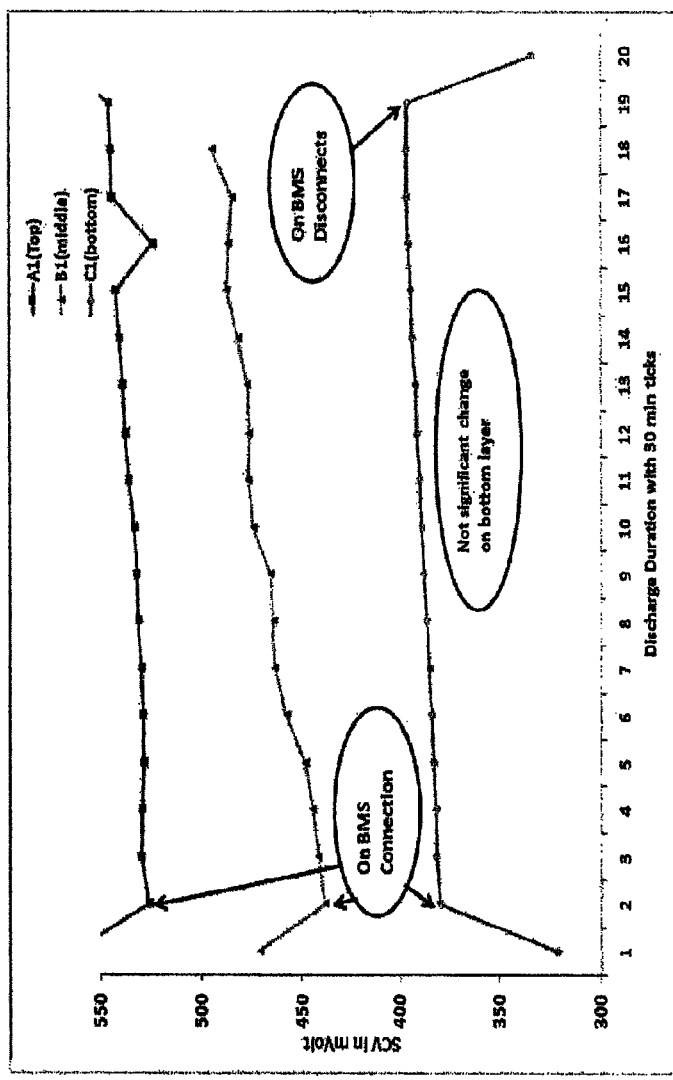
FIG. 14 is a graphical representation of SCV at the positive electrodes of FIG. 9 during discharging.
Figure 15:
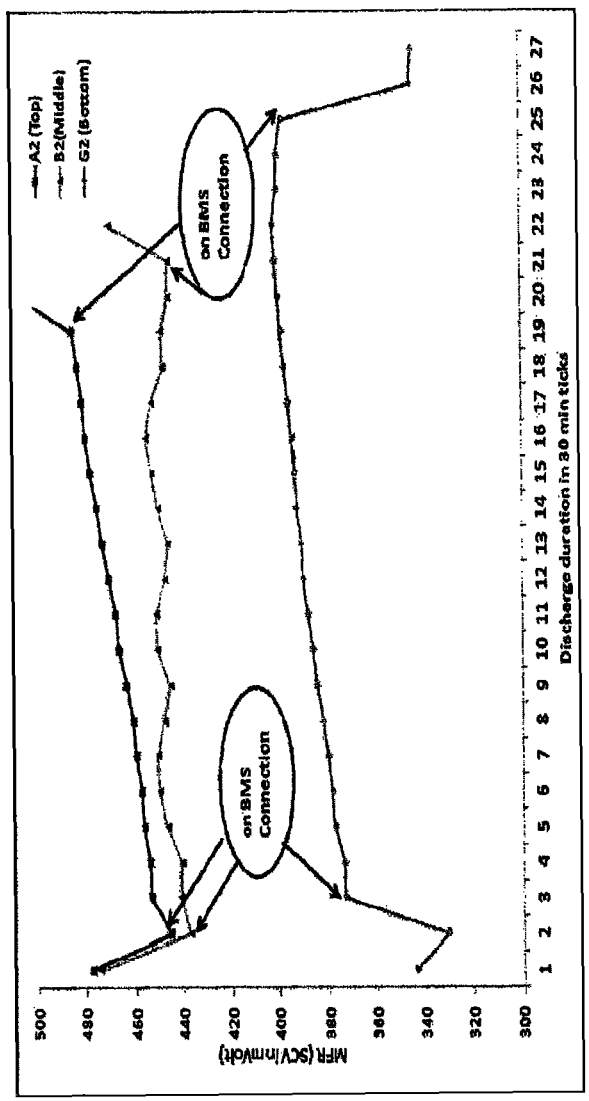
FIG. 15 is a graphical representation of SCV at a center column position of FIG. 9 during discharging.
Figure 16:
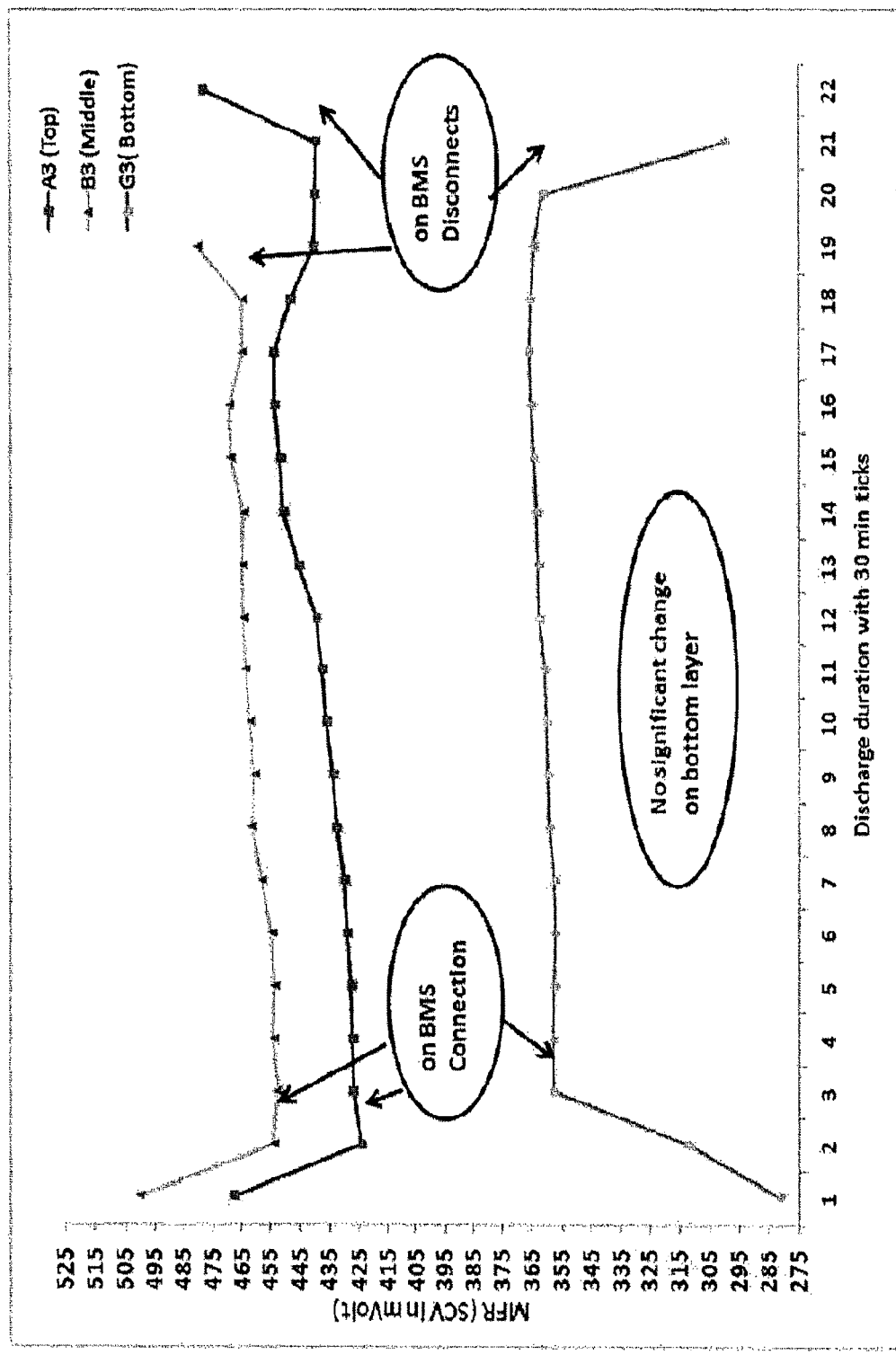
FIG. 16 is a graphical representation of SCV at the negative electrodes of FIG. 9 during discharging.

FIG. 14 is a graphical representation of SCV at the positive electrodes 74 of the battery 70 in FIG. 9 during discharging, FIG. 15 is a graphical representation of SCV at a center column position of the battery 70 in FIG. 9 during discharging, FIG. 16 is a graphical representation of SCV at the negative electrodes 76 of the battery 70 in FIG. 9 during discharging. With reference to FIG. 14, SCV at the top, middle and bottom row positions on the positive electrode 74 of the 3×3 matrix of the battery 70 in FIG. 9 are illustrated whereby certain observational patterns and analyses described above are verified. For example, it was observed that SCV increases with battery discharge and that SCV decreases from top to bottom at the positive electrode 74. FIG. 14 also illustrates similar patterns on the BMS connection to the battery terminal; however, FIG. 14 illustrates that the maximum relative increase in the SCV appears at the B1 position. With reference to FIG. 15, SCV at the top, middle and bottom row positions on the center position of the 3×3 matrix of the battery 70 in FIG. 9 are illustrated whereby certain observational patterns and analyses described above are verified. The center column position appears to illustrate similar patterns as those for the positive electrode 74 (see FIG. 14); however, the SCV of row A2 and B2 are demonstrably closer. With reference to FIG. 16, SCV at the top, middle and bottom row positions on the negative electrode 76 of the 3×3 matrix of the battery 70 in FIG. 9 are illustrated whereby certain observational patterns and analyses described above are verified. At the negative electrode 76 the middle row B3 indicates a higher SCV and is unlike the patterns at the positive electrode 74 and center column of the battery 70; however, the higher SCV at row B3 is similar to that depicted in FIG. 12 at the negative electrode 76 during charging. Similar to other patterns, FIG. 16 also depicts SCV increases during the discharge process, negligible change at the bottom row G3 position, and similar patterns on the BMS connection. FIGS. 14-16 confirm previous analyses that SCV increases with the discharge of the battery, that the discharged state shows a higher SCV as compared to the charged state of the battery, and that the concentration gradient of H+ proton at the positive electrode and at the center column follows a similar pattern and shows stratification of the electrolyte. H+ proton concentration at the negative electrode, however, appears to follow the same pattern as in the charging process illustrated in FIG. 12 as the concentration patterns appear to reflect the structure of negative electrode or the reaction center at the negative electrode as explained above. Additionally, during the discharge process, relative SCV demonstrates a unique pattern whereby relative SCV generally represents a change in SCV from the start of a discharge process to the end of the process. For example and with reference to FIGS. 14-16, maximum relative SCV appears to occur at different row positions in each column during the discharge process. At the positive electrode, maximum relative SCV appears to occur at the middle B1 position; however, at the center column and negative electrode, maximum relative SCV appears to occur at the top positions A2 and A3, respectively, as the discharge process primarily consumes $OH^-$ ions which are heavy and slow to diffuse thereby making the discharge process a non-homogenous process. At the nodes, relative SCV change appears to relate to the high concentration of H+ protons and lack of $OH^-$ ions suggesting that a large consumption of $OH^-$ ions at these nodes occurs during a discharge process. It follows that the middle B1 position at the positive electrode and top positions A2, A3 at the center and negative electrode, respectively, are active reaction nodes which consume larger $OH^-$ ions as compared to other nodes during the discharge process. Furthermore, a high reaction rate (fast reaction) appears to create more ions in the electrolyte and on the surface of the electrodes (nodes). Over the discharge process, these ions appear to increase SCV at certain nodes which are then considered to be active nodes on the electrode.

Figure 17:
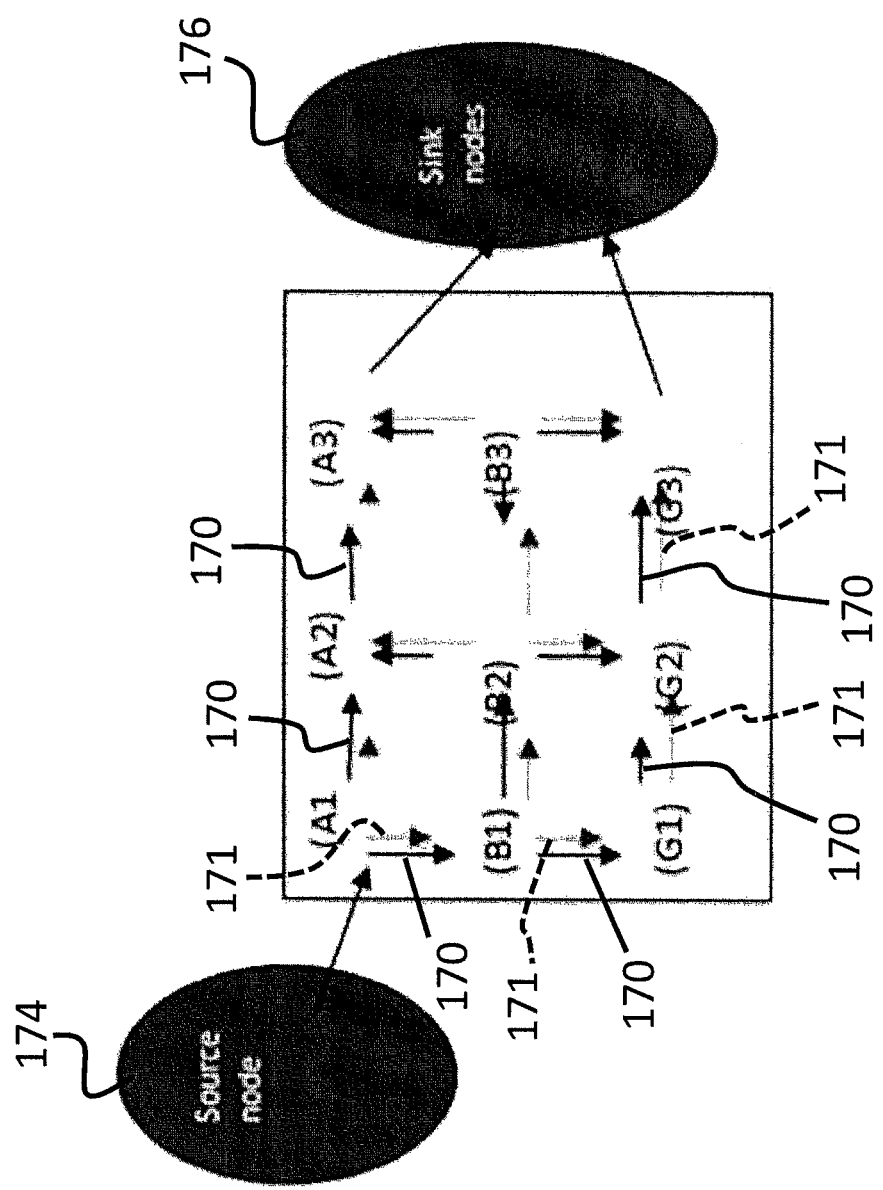
FIG. 17 is a schematic depiction of the beginning state of H+ proton concentration during charging and discharging at the node positions in FIG. 9.
Figure 18:
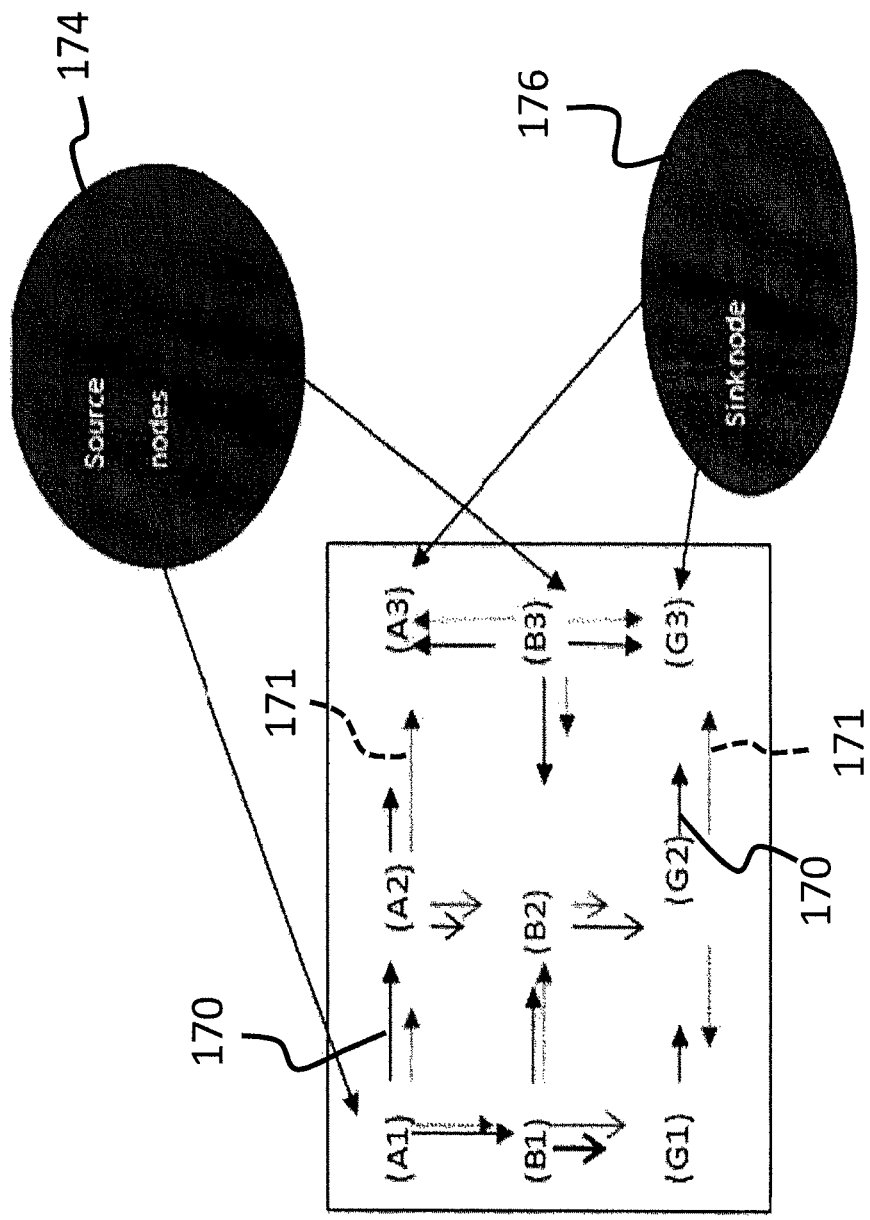
FIG. 18 is a schematic depiction of the end state of H+ proton concentration during charging and discharging at the node positions in FIG. 9.

FIG. 17 is a schematic depiction of the beginning state of H+ proton concentration during charging and discharging at the electrode or node positions depicted in FIG. 9. FIG. 18 is a schematic depiction of the end state of H+ proton concentration during charging and discharging at the electrode or node positions depicted in FIG. 9. As noted above, observational measurements of the 3×3 matrix positions of magnetic coils on an exemplary battery external frame may provide an indication of H+ proton concentration. FIGS. 17 and 18 provide a schematic depiction of a concentration for the electrode or node positions of the battery depicted in FIG. 9 during a charging and discharging process, respectively. In each figure, arrows generally point towards a relative change from higher to lower H+ proton concentration which may be considered as a dominating factor for MFR change between row and column positions (e.g., nodes). With reference to FIG. 17, the beginning state of H+ proton concentration is depicted during the dynamic process of battery charging whereby darker, solid arrows 170 represent starting MFR (SCV) and lighter, dashed arrows 171 represent an end value of MFR (SCV). With reference to FIG. 18, the end state of H+ proton concentration is depicted during the dynamic process of battery discharging whereby the arrows 170 represent starting MFR (SCV) and the arrows 171 represent the end value of MFR (SCV). Source nodes 174 generally suggest a higher accumulation of the H+ proton and sink nodes 176 illustrate a lower accumulation of the H+ proton. Generally, FIGS. 17 and 18 illustrate that positive electrodes possess higher H+ proton concentration as it appears the higher MFR at the positive electrode may be due to H+ protons since electrode susceptibility may play a role herein, thus the MFR should be high during the beginning of discharging (due to lead oxide) but not at the beginning of charging when the electrode is lead sulfate. FIGS. 17 and 18 also illustrate H+ proton accumulation and diffusion direction during the respective charging and discharging processes. For example, these figures illustrate that a higher concentration of H+ protons exist at the positive electrode during the charging and discharging process. The H+ proton is the primary ion consumed by electrodes during charging and the $OH^-$ ion is consumed during discharging thereby explaining why the positive electrode is an active electrode during discharging but not during the charging process. The depicted concentration gradient profile may thus describe or reflect reaction rate profile on or at the electrodes, electrode structure, and electrolyte stratification inside the battery during the charging and discharging processes.

Embodiments of the present subject matter may thus employ a noninvasive MFR probing method as a battery health diagnostic tool by measuring charging and discharging processes and associated values therein for battery. While SCV has been described herein as an index for the performance of the battery under a magnetic field or MFR, such a description or association is exemplary only and should not limit the scope of the claims appended herewith. Further, embodiments of the present subject matter may analyze and/or diagnose electrode surface structure using MFR variations and/or an electrode's non-homogeneous participation in the charging and discharging processes. Additionally, recording and/or monitoring of an electrode's health indication and the measurements and/or indication of electrolytic stratification during run-time may result in an efficient monitoring of battery health.

Figure 19:
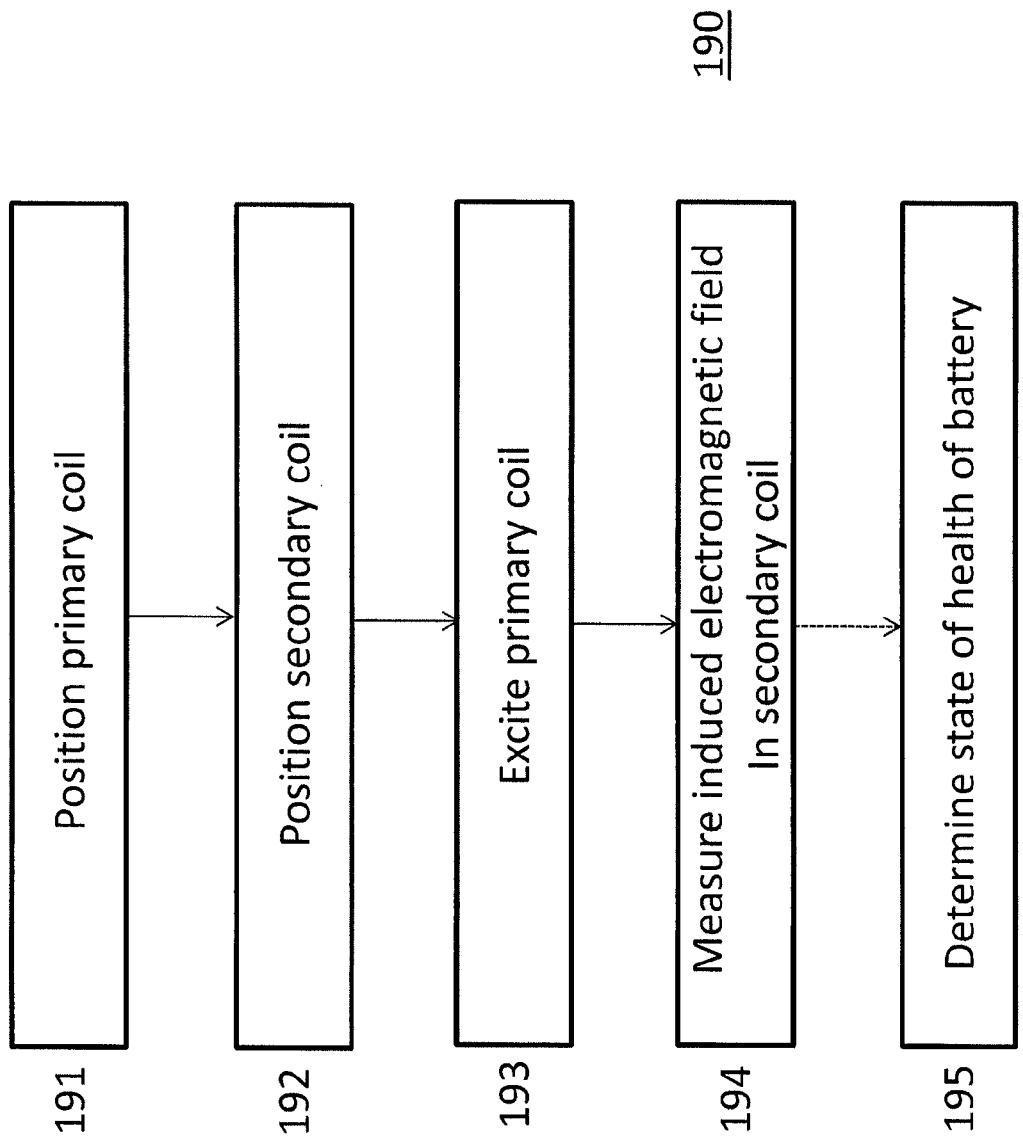
FIG. 19 is a block diagram of one embodiment of the present subject matter.

FIG. 19 is a block diagram of one embodiment of the present subject matter. With reference to FIG. 19, a method 190 is provided for determining the health of a battery. Exemplary batteries may be, but are not limited to, lead acid batteries, sealed lead acid batteries, or any batteries used in or a part of an electric vehicle, a hybrid electric vehicle, an uninterrupted power supply system, a backup power system for a cell tower, a power system for a cell tower, a backup power system for a data storage system, or a power system for a data storage system. The method 190 may include, at step 191, positioning a primary coil along a first portion of a battery and, at step 192, positioning a secondary coil along a second portion of the battery. At step 193, the primary coil may be excited using a signal (e.g., a sinusoidal signal), and at step 194, an electromagnetic field induced in the secondary coil by the excited primary coil may be measured. The induced electromagnetic field may be an alternating current emf. A state of health of the battery may then correlate to the measured electromagnetic field. In one embodiment, a state of health of the battery may be determined during operation (e.g., discharging, charging, equilibrium) of the battery using the measured electromagnetic field at step 195. In another embodiment, the state of health may be determined as a function of a value selected from the group consisting of electrolyte stratification, current profile, electrode structure, electrode surface degradation, and combinations thereof. In a further embodiment, step 195 may include inferring electrolyte stratification, current profile, electrode structure, or electrode surface degradation from additional primary and secondary coils positioned at different portions of the battery.

Figure 20:
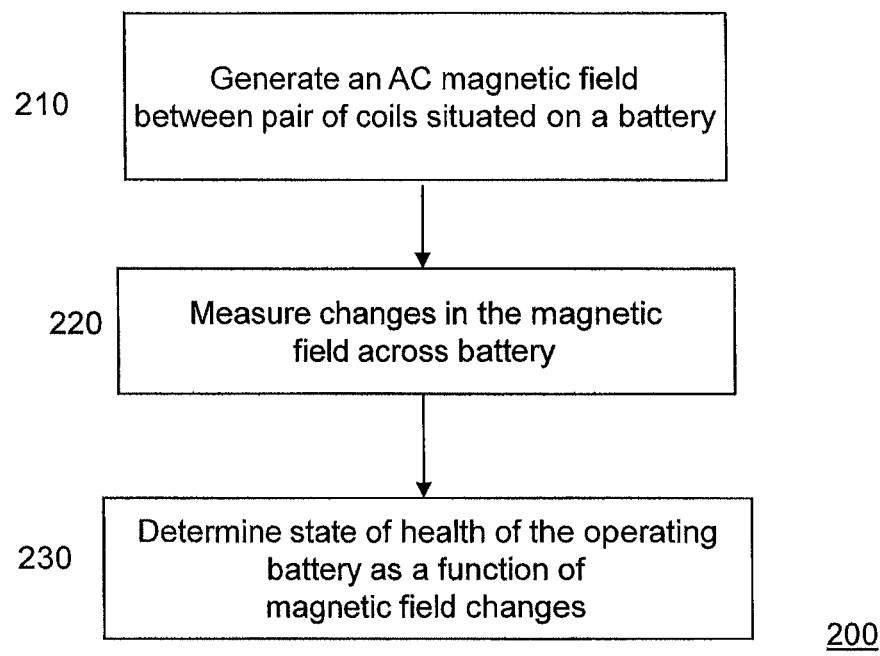
FIG. 20 is a block diagram of another embodiment of the present subject matter.

FIG. 20 is a block diagram of another embodiment of the present subject matter. With reference to FIG. 20, a noninvasive magnetic field probing method 200 is provided for monitoring a battery during battery operation. Exemplary batteries may be, but are not limited to, lead acid batteries, sealed lead acid batteries, or any batteries used in or a part of an electric vehicle, a hybrid electric vehicle, an uninterrupted power supply system, a backup power system for a cell tower, a power system for a cell tower, a backup power system for a data storage system, or a power system for a data storage system. The method 200 may include generating an alternating current magnetic field between at least one pair of coils situated on a battery at step 210, and measuring changes in the magnetic field across the battery at step 220. In one embodiment, the coils may be placed on opposing sides of the battery such that a magnetic field generated by the coils is substantially perpendicular to an electric field between electrodes of the battery. At step 230, a state of health of the operating battery may correlate to or be determined as a function of the measured magnetic field changes. In one embodiment, step 230 may include inferring electrolyte stratification, current profile, electrode structure, or electrode surface degradation from the measured magnetic field changes.

In one aspect of embodiments of the present subject matter magnetic flux lines described above may be linked to the secondary coil through the magnetic dipole moment of the H+ proton and through the diamagnetic property of electrode materials such as, but not limited to, lead, lead oxide and lead sulfate. Thus, as battery state of charge or state of health and H+ proton concentration changes during charging and discharging, a magnetic field response may reflect such changes in the secondary coil. In another aspect of embodiments of the present subject matter, stratification and electrode structure information may be inferred by positioning the coils at various horizontal and vertical nodes of an external frame of a battery whereby variations of the flux linking between the primary and secondary coils reflect concentration change in the electrolyte vertically and horizontally within the battery and suggest a change in the battery electrode structure. Such exemplary, noninvasive techniques may provide an indication of electrolyte stratification, electrode structure, and current profile between the electrodes of a battery during operation thereof. Stratification and electrode structure are two major causes of battery health degradation and premature capacity loss. For example, stratification makes battery electrolyte non-homogeneous and reduces the electrolyte strength. Deterioration of an electrode's structure reduces the electrode surface active mass for chemical reaction during battery charging/discharging leading to premature capacity loss. Thus, it is an aspect of embodiments of the present subject matter to measure such health indications in run-time conditions of a battery, e.g., during battery charging, discharging, and stationary conditions, when the battery is subjected to an AC magnetic field environment. As described above, magnetic flux lines are affected by the density of H+ protons whose magnetic dipole moments substantially align along the magnetic flux lines. As H+ proton density varies with the charging and discharging of a, e.g., SLA battery, so does the magnetic field response. This variation in magnetic field response may then be used as a measure of electrolyte stratification, current profile across the electrode, and electrode structure.

Systems according to embodiments of the present subject matter may include a processing unit wirelessly (or via wireline) coupled to the battery and/or signal analyzer and at least one communication unit being configured to operate in conjunction with the system to monitor the state of health of a respective battery. Of course, the communication unit may be configured to report measurements, information, and other data to a remote communication device, which may transmit this information to a user, server, processor, etc. Thus, embodiments of the present subject matter including any type of sensor or combinations thereof may include some form of real-time remote monitoring and reporting of battery health.

A battery monitoring systems according to embodiments of the present subject matter are suitable for long-term continuous monitoring of battery health, exemplary measurements described above may be gathered in real time. Such real-time data, whether in the form of raw data or analyzed results, of battery health in a respective EV, HEV, UPS, grid energy storage system, etc. may improve system performance and reduce costs. Therefore, it is an aspect of embodiments of the present subject matter to provide a monitoring, feedback, and/or control system having one or more battery monitoring systems located within a respective power system (e.g., data storage power system, back-up system, EV, HEV, UPS, grid energy storage systems, etc.) or portion thereof. Through the data measured and provided by such embodiments, appropriate circuitry may be employed to monitor the battery health of the respective batteries in such mobile or stationary systems.

While embodiments have been heretofore described in connection with LA or SLA batteries, the scope of the claims appended herewith should not be so limited. For example, it is envisioned that embodiments of the present subject matter may find utility in any industry that employs batteries having a liquid electrolyte. Further and as noted above, embodiments of the present subject matter may be applicable to lithium-ion batteries such as, but not limited to, $LiFePO_4$ batteries. In such an embodiment, battery state of health indications, e.g., battery age, etc., may be observed by factors such as capacity loss, increase in impedance, change in temperature (due to change in impedance), leakage in the graphite anode, active material loss at the anode and the cathode, and polymer (electrolyte) aging. For example, $Li^+$ is a diamagnetic ion which may affect a magnetic field. Therefore, a concentration of lithium ions at the anode during charging and discharging will alter the external existing magnetic field. During $Li^+$ leakage in the graphite galleries, the $Li^+$ ions flow in the vertical direction within the negative electrode and cause an inhomogeneous current profile within the anode. This may change $Li^+$ ion concentration distribution at the electrode and can be detected through an exemplary magnetic field probing method described herein. With respect to the cathode, during a battery cycle $LiFePO_4$ converts to $FePO_4$, and this delithiation process alters the valence of the iron ion from $Fe^{+2}$ to $Fe^{+3}$. It follows that this valence change of iron affects its magnetic properties, which in turn affects the values detectable by an exemplary magnetic field probing method. In lithium-ion batteries, solid electrolyte interphase (SEI) layer formation and deformation may alter the conductivity and electric field strength between battery electrodes which may be detected by exemplary magnetic field probing methods. Further, it is envisioned that exemplary magnetic field probing methods may detect out-gassing from such batteries as the formed gasses are products of electrolyte decomposition and/or products of $Li^-$ interaction with the electrolyte. Thus, embodiments of the present subject matter may detect changes in the state of health of not only LA and SLA batteries, but also lithium-ion and other batteries and the claims appended herewith should not be so limited.

Additionally, data, commands and other information or messages may be sent or received, wirelessly or via wire-line depending upon the application, from or to various utilizing an exemplary system. For example, an exemplary monitoring system may collect information from a sensor or analyzer monitoring battery health and may provide such information to a user or to a database for real-time or stored use. Such provision (i.e., transmission) of information may be via any known mode of transmission (e.g., wireless or wire-line, as applicable). Such information may also be provided directly to a user or may be provided to a user via a processor for manipulation and/or storage thereof. Of course, the processor and supporting systems may also be employed to provide messages and/or commands to the remote or local sensor, device, etc. as the need arises. Thus, it is envisioned that embodiments may be implemented using a general purpose computer programmed in accordance with the principals discussed herein. It is also envisioned that embodiments of the subject matter and the functional operations described in this specification may be implemented in or utilize digital electronic circuitry, or in computer software, firmware, or hardware, including the structures disclosed in this specification and their structural equivalents, or in combinations of one or more of them. Thus, embodiments of the subject matter described in this specification can be implemented in or utilize one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

To note, the term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Of course, the general processes described by monitoring systems herein may be performed by one or more programmable processors executing one or more computer programs to perform functions by operating on input data and generating output. These processes may also be performed by special purpose logic circuitry, e.g., a field programmable gate array (FPGA) or an application specific integrated circuit (ASIC). Processors suitable for the execution of an exemplary computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, to name just a few.

Computer readable media suitable for storing computer program instructions and data include all forms of data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, exemplary systems according to embodiments of the subject matter may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification may also be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system may be interconnected by any form or medium of digital data communication, e.g., a communication network. Examples of communication networks include a local area network (LAN) and a wide area network (WAN), e.g., the Internet. The computing system may also include clients and servers as the need arises. A client and server are generally remote from each other and typically interact through a communication network. The relationship of client and server arises by virtue of computer programs running on the respective computers and having a client-server relationship to each other.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-20, a method and system for magnetic field probing for sealed-acid battery diagnosis have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method comprising the steps of:
positioning a primary coil along a first portion of a battery;
positioning a secondary coil along a second portion of the battery such that the battery is disposed between the primary coil and the secondary coil;
exciting the primary coil with a signal; and
measuring an electromagnetic field induced in the secondary coil by the excited primary coil, the electromagnetic field being arranged substantially perpendicular to an electric field between electrodes of the battery,
wherein the measured electromagnetic field correlates to a state of health of the battery during operation thereof.

2. The method of claim 1 wherein the second portion of the battery opposes the first portion of the battery.

3. The method of claim 1 wherein the battery is a lead acid battery, a lithium-ion battery, or a sealed lead acid battery.

4. The method of claim 1 wherein the battery is part of an electric vehicle, a hybrid electric vehicle, an uninterrupted power supply system, a backup power system for a cell tower, a power system for a cell tower, a backup power system for a data storage system, a grid energy storage system, or a power system for a data storage system.

5. The method of claim 1 wherein the operation comprises a discharging, charging, or equilibrium process.

6. The method of claim 1 wherein the signal is a sinusoidal signal.

7. The method of claim 1 wherein the state of health is determined as a function of a value selected from the group consisting of electrolyte stratification, current profile, electrode structure, capacity loss, increase in impedance, change in temperature, electrolyte leakage, electrode material loss, polymer aging, electrode surface degradation, and combinations thereof.

8. The method of claim 1 wherein the electromagnetic field is an alternating current electromagnetic field.

9. The method of claim 1 further comprising the step of determining a state of health of the battery during operation of the battery using the measured electromagnetic field.

10. The method of claim 9 wherein the step of determining a state of health of the battery further comprises inferring electrolyte stratification, current profile, electrode structure, capacity loss, increase in impedance, change in temperature, electrolyte leakage, electrode material loss, polymer aging, or electrode surface degradation from additional primary and secondary coils positioned at different portions of the battery.

11. A system for monitoring a battery comprising:
a primary coil positioned along a first portion of a battery;
a secondary coil positioned along a second portion of the battery such that the battery is disposed between the primary coil and the secondary coil;
a signal generator connected to the primary coil for generating a signal to excite the primary coil; and
a signal analyzer for measuring a magnetic response induced in the secondary coil by the excited primary coil,
wherein the measured magnetic response correlates to battery health, and
wherein the primary and second coils are arranged such that an electromagnetic field induced by the primary coil is substantially perpendicular to an electric field between electrodes of the battery.

12. The system of claim 11 wherein the second portion of the battery opposes the first portion of the battery.

13. The system of claim 11 wherein the battery is a lead acid battery, a lithium-ion battery, or a sealed lead acid battery.

14. The system of claim 11 wherein the signal analyzer is a voltmeter or a spectrum analyzer.

15. The system of claim 11 wherein the battery is part of an electric vehicle, a hybrid electric vehicle, an uninterrupted power supply system, a backup power system for a cell tower, a power system for a cell tower, a backup power system for a data storage system, a grid energy storage system, or a power system for a data storage system.

16. The system of claim 11 wherein the generated signal is a sinusoidal signal.

17. The system of claim 11 further comprising additional primary and secondary coils positioned at different portions of the battery to monitor battery health at different levels of the battery.

18. The system of claim 11 wherein battery health is determined as a function of a value selected from the group consisting of electrolyte stratification, current profile, electrode structure, capacity loss, increase in impedance, change in temperature, electrolyte leakage, electrode material loss, polymer aging, electrode surface degradation, and combinations thereof.

19. The system of claim 11 further comprising a wireless or wire-line transmitter to provide information from the signal analyzer to a processor remote from the battery.

20. A non-invasive magnetic field probing method to monitor a battery during battery operation comprising the steps of:
generating an alternating current magnetic field between at least one pair of coils situated on opposite sides of a battery;
measuring changes in the magnetic field across the battery; and
determining a state of health of the operating battery as a function of the measured magnetic field changes,
wherein the pair of coils is arranged such that an electromagnetic field between the pair of coils is substantially perpendicular to an electric field between electrodes of the battery.

21. The method of claim 20 wherein the step of determining a state of health further comprises inferring electrolyte stratification, current profile, electrode structure, capacity loss, increase in impedance, change in temperature, electrolyte leakage, electrode material loss, polymer aging, or electrode surface degradation from the measured magnetic field changes.

22. The method of claim 20 wherein the battery is a lead acid battery, a lithium-ion battery, or a sealed lead acid battery.

* * * * *